(12) United States Patent
Kumada

(10) Patent No.: US 6,549,654 B1
(45) Date of Patent: Apr. 15, 2003

(54) IMAGE PROCESSING METHOD AND APPARATUS AND STORAGE MEDIUM STORING PROCESSES OF EXECUTING THE METHOD

(75) Inventor: Shuichi Kumada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/296,303

(22) Filed: Apr. 22, 1999

(30) Foreign Application Priority Data

Apr. 27, 1998 (JP) .......................................... 10-116898
Apr. 27, 1998 (JP) .......................................... 10-116899

(51) Int. Cl.[7] ................................................ G06K 9/00
(52) U.S. Cl. ........................ 382/162; 345/590; 358/401
(58) Field of Search ................................. 382/162–167, 382/112, 305; 358/512–528, 449–451; 345/418, 589, 590, 604; 348/661; 356/405

(56) References Cited

U.S. PATENT DOCUMENTS

| | | | | |
|---|---|---|---|---|
| 5,185,661 A | * | 2/1993 | Ng | 358/505 |
| 5,208,911 A | * | 5/1993 | Newman et al. | 345/600 |
| 5,237,409 A | * | 8/1993 | Yamaguchi | 348/391.1 |
| 5,268,754 A | * | 12/1993 | Van de Capelle et al. | 358/527 |
| 5,384,901 A | * | 1/1995 | Glassner et al. | 345/591 |
| 5,668,890 A | * | 9/1997 | Winkelman | 382/167 |
| 5,677,967 A | * | 10/1997 | Pariser | 382/167 |
| 5,724,442 A | * | 3/1998 | Ogatsu et al. | 382/167 |
| 5,724,443 A | * | 3/1998 | Nishikawa | 382/167 |
| 5,754,184 A | * | 5/1998 | Ring et al. | 345/604 |
| 6,091,518 A | * | 7/2000 | Anabuki | 358/500 |

* cited by examiner

Primary Examiner—Jayanti K. Patel
(74) Attorney, Agent, or Firm—Fitzpatrick, Cella, Harper & Scinto

(57) ABSTRACT

An image processing apparatus having a discriminating unit for discriminating a data type of a color document and a selecting unit for selecting an output device for outputting the color document from a plurality of output devices in accordance with a discrimination result by the discriminating unit and color reproduction range information of output devices. An optimum output device can be selected from a plurality of output devices, while taking into consideration the color reproduction ability of each output device with respect to the data type of each color document.

19 Claims, 28 Drawing Sheets

—— PRINTER A
------ PRINTER B
—·—·— PRINTER C

FIG. 23

SELECTION OF COLOR REPRODUCTION

⊙ ATTACH IMPORTANCE TO IMAGE OUTPUT

○ ATTACH IMPORTANCE TO OUTPUT OF DRAWING/CHARACTER

FIG. 24

RECOMMENDED COLOR PRINTER

PRINTER NAME

LBP-2030

IMAGE PROCESSING METHOD AND APPARATUS AND STORAGE MEDIUM STORING PROCESSES OF EXECUTING THE METHOD

BACKGROUND OF THE INVENTION

1. Field of the Invention

The present invention relates to an image processing method which uses color reproduction range information of an output device, and to an image processing apparatus and a storage medium storing processes for realizing such a method.

2. Related Background Art

A range of color reproduction of each color printer changes with its characteristics (characteristics of ink and toner, recording method and the like).

FIG. 1 shows examples of the color reproduction range. The x-y coordinates are called chromaticity coordinates which are often used when the color reproduction range of a color output device is shown in a two-dimensional area. Areas indicated by a solid line, a broken line and a one-dot chain line are the color reproduction areas of the color printers A, B and C. As seen from FIG. 1, the color reproduction range becomes larger in the order of printers A, C and B and the range of the printer A includes the range of the printer B. Namely, all colors the printer B can reproduce can be reproduced by the printer A.

FIG. 2 shows an example of the structure of a printer profile in conformity with the profile specification of ICC (International Color Consortium). This profile is constituted of a header field for management, a tag table which stores pointers to tag data, and a tag data storage field including a required tag field, an optional tag field and a private tag field. The header field stores therein device information indicating which device (e.g., monitor) has this profile, CMM (Color Management Module) information indicating which CMM uses this profile, and other information. The tag data storage field stores therein profile description information for identifying the profile. The profile description information includes, for example, a manufacturer name and a product name such as "Canon LBP-2030".

The required tag field stores gamut tag data which indicates the color reproduction range of the printer.

FIG. 3 shows the data structure of the gamut tag data. The gamut tag data contains data which is used for checking whether the printer can reproduce an input device independent color (CIE xyz and CIE LAB (hereinafter described as L*a*b)). If the gamut tag data contains data for all combinations of input colors, the capacity of data becomes large. Therefore, generally, the three-dimensional input color space is divided into grids and data is allocated only to these grids (more specifically, the data are assigned to particular points, such as intersections of grid lines, in the grids, but this is expressed in this specification in terms of the data being assigned or allocated to the grids, and generally, the term "grids" is used to refer to the points in color space for which data is assigned). If an input color does not correspond to the grids, the data for the input color is calculated from interpolation of data at nearby grids. In the example shown in FIG. 3, the input color space L*a*b* is divided into four along each axis. At each grid, ON data is allocated if the printer can output the color at the grid and OFF data is allocated if the printer cannot output the color.

FIG. 4 is a diagram illustrating a gamut check function of CMM. The gamut check function is a function of judging whether input RGB data whose characteristics are defined by a source profile (profile of a scanner or a monitor) can be output from a printer whose characteristics are defined by a printer profile. In accordance with information of the source profile and gamut tag data of the printer profile, a gamut check function of CMM judges whether the input RGB data can be output from the printer, and if the data can be output, ON data is returned, whereas if not, OFF data is returned.

FIG. 5 is a diagram illustrating the details of the process to be executed by the gamut check function illustrated in FIG. 4. The input RGB data is converted into L*a*b* in accordance with the information (data used for converting RGB data into device independent color space L*a*b*) in the source profile. The L*a*b is input to the gamut check function which refers to the gamut data in the printer profile to judge whether the color can be output, and if the color can be output, ON data is output, whereas if not OFF data is output.

As described above, conventionally, whether color data can be output from a printer is judged from the gamut tag data in the printer profile.

FIG. 6 is a diagram illustrating a print proof process using a function of CMM. The meaning of a color matching proof is that the results of input RGB data, whose characteristics are defined by the source profile (profile of a scanner or monitor), to be output color matched from a printer, are simulated on another printer. This other printer simulating the print results is called a proof printer. In this case, the proof printer is generally required to include the color reproduction range (gamut) of a printer to be simulated, because if it does not include, the simulation precision is degraded. FIG. 6 illustrates an example of a process of simulating an output of the printer B by using the printer A shown in FIG. 1. Since the printer A includes the gamut of the printer B, the requirements as a proof printer are satisfied. In this print proof process, a color matching process is performed for the input RGB data whose characteristics are defined by the source profile, by using the printer profile of the printer B, to thereby convert the input RGB data into color data in the color space of the printer B (into color data in the gamut of the printer B). A color matching process is performed for the color space data by using the printer profile (source) of the printer B and the printer profile (output) of the printer A, to thereby convert the color data in the color space of the printer A into color data in the color space of the printer A (into color data in the gamut of the printer A).

FIG. 7 shows an example of a print dialog to be used by the proof process. Conventionally, in order to perform the proof process one example of which has been described with reference to FIG. 6, it is necessary to select a monitor profile as the source profile and a printer profile of a simulated printer and a printer profile of a proof printer as the output profiles.

In a network system having a plurality of color printers, a color document is printed by selecting one of the printers. In such a case, it is conventionally not easy to select an optimum color printer and output a color document by taking into consideration the color reproduction ability of each color printer matching the data type of the color document.

Also in a network system having a plurality of color printers, one of the color printers is selected and its output results are simulated through a color matching process by using another printer as a proof printer. In such a case, it is conventionally not easy to select an optimum proof printer and simulate the output results.

SUMMARY OF THE INVENTION

It is an object of the present invention to select an output device by taking into consideration of the color reproduction ability of each output device matching the data type of a color document.

According to a preferred embodiment of the invention achieving the above object, an image processing apparatus comprises means for discriminating an image type of a color document, and means for selecting an output device for outputting the color image from among a plurality of output devices on the basis of a discrimination result obtained by the discriminating means and color gamut information of the plurality of output devices. It is another object of the present invention to automatically select an optimum proof printer from a plurality of printers in order to simulate the output results of another printer through a color matching process by using the proof printer.

According to a preferred embodiment of the invention achieving the above object, an image processing method comprises the steps of discriminating an image type of a color document, and selecting an output device for outputting the color document from among a plurality of output devices on the basis of a discrimination result obtained in the discriminating step and color gamut information of the plurality of output devices. It is another object of the present invention to compare color reproduction ranges at high speed.

According to a preferred embodiment of the invention achieving the above object, an image processing method comprises the steps of inputting a multi-dimensional table representing color gamut information of a first device and a multi-dimensional table representing color gamut information of a second device, and comparing a color reproduction range of the first device with a color gamut of the second device by matching the number of grids of the multi-dimensional table representing the color gamut information of the first device and the number of grids of the multi-dimensional table representing the color gamut information of the second device.

Still other objects of the present invention and the advantages thereof will become fully apparent from the following detailed description of the embodiments.

BRIEF DESCRIPTION OF THE DRAWINGS

FIG. 23 shows an example of a print dialog displayed by application software 119.

FIG. 24 shows an example of a print dialog displayed by the application software 119.

DETAILED DESCRIPTION OF THE PREFERRED EMBODIMENTS

First Embodiment

Figure 8:
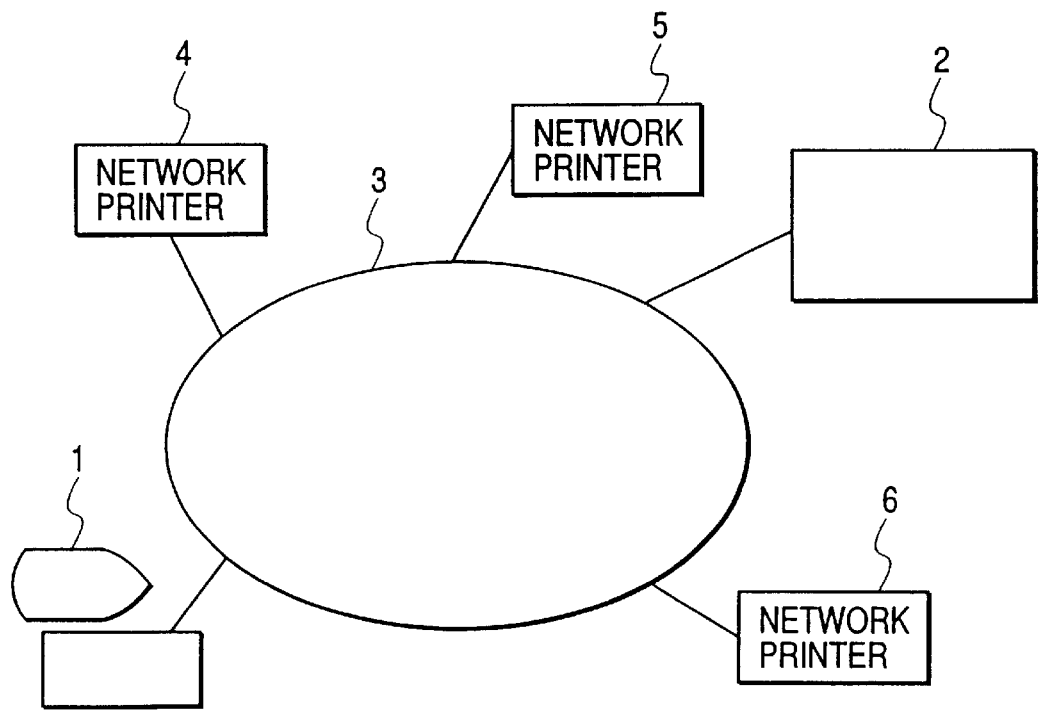
FIG. 8 is a diagram showing the configuration of a network system according to a first embodiment of the invention.

FIG. 8 is a diagram showing the configuration of a network system according to a first embodiment of the invention. The network system shown in FIG. 8 is constituted of a client PC 1, a network server 2, network printers 4, 5 and 6, and a network 3 interconnecting these five devices.

The network server 2 has a CPU, a RAM, a hard disc drive and the like necessary for image processing and print processing and a communication function necessary for communications over the network. The network printers 4, 5 and 6 are assumed to be in correspondence with the printers A, B and C having the color reproduction ranges shown in FIG. 1.

Figure 9:
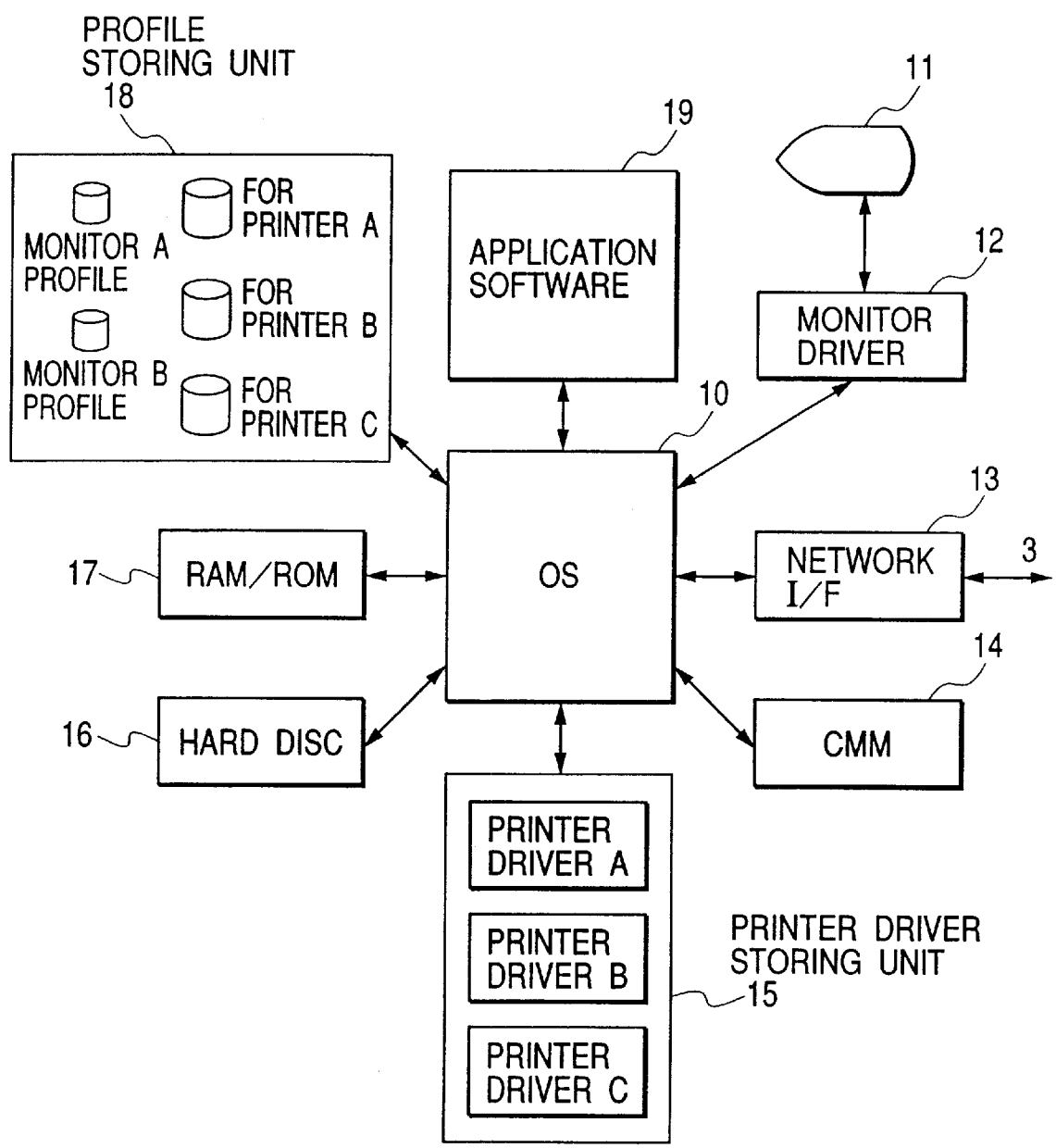
FIG. 9 is a diagram showing the structure of a client PC 1 shown in FIG. 1.

FIG. 9 is a diagram showing the structure of the client PC 1 shown in FIG. 8. As shown in FIG. 9, the client PC 1 has: a CPU, a VRAM and the like necessary for monitor display and image processing: an OS (operating system) 10 for providing a fundamental function necessary for the operation of software such as application software; a monitor 11; a monitor driver 12 for controlling monitor display, a network I/F 13 for connection of the PC 1 to the network 3; a CMM (Color Management Module) 14 which is a module for executing a color matching process; a printer driver storing unit 15 for storing printer drivers A, B and C of the network printers A, B and C; a hard disc drive 16; a RAM/ROM 17 used as a working memory by an application and OS for the color matching process and the like; a profile storing unit 18 for storing printer profiles A, B and C of the network printers A, B and C, a monitor profile A of the monitor 11 and the like; and application software 19 for forming or managing color documents.

Figure 19:
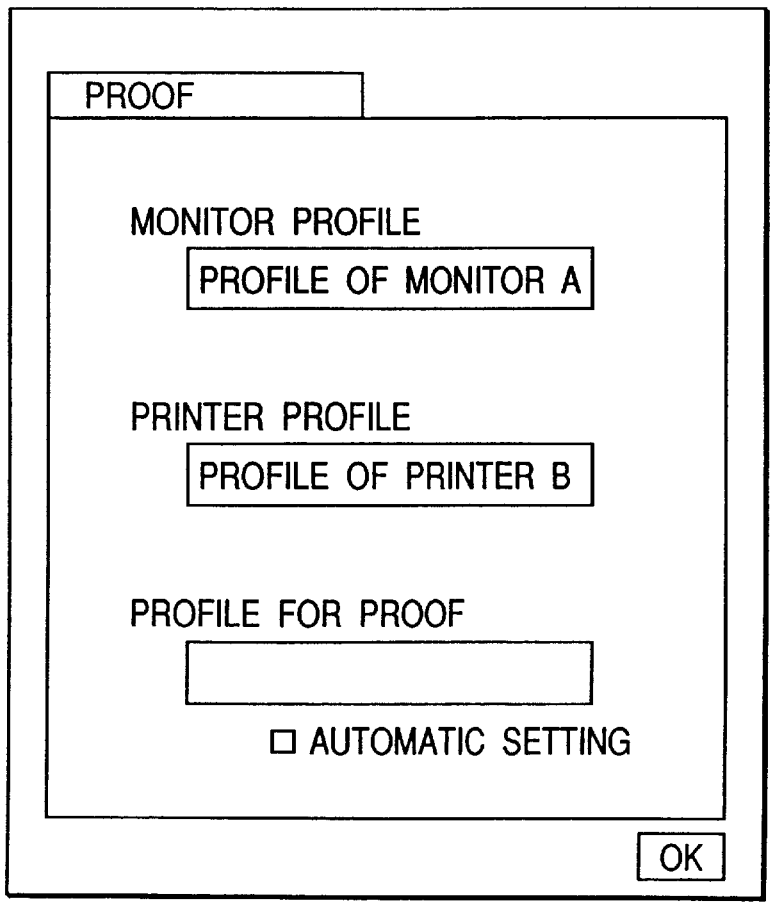
FIG. 19 shows a dialog for setting proof process conditions.

In this embodiment, the application software 19 displays a dialog such as shown in FIG. 19 to set various conditions for a proof process. A different point of the conventional dialog shown in FIG. 7 from the dialog of this embodiment is that the embodiment can set a function of automatically setting a proof profile. By using this automatic proof profile setting function, an optimum proof printer can be automatically set in accordance with gamut data representative of the color reproduction range of each printer.

Figure 10:
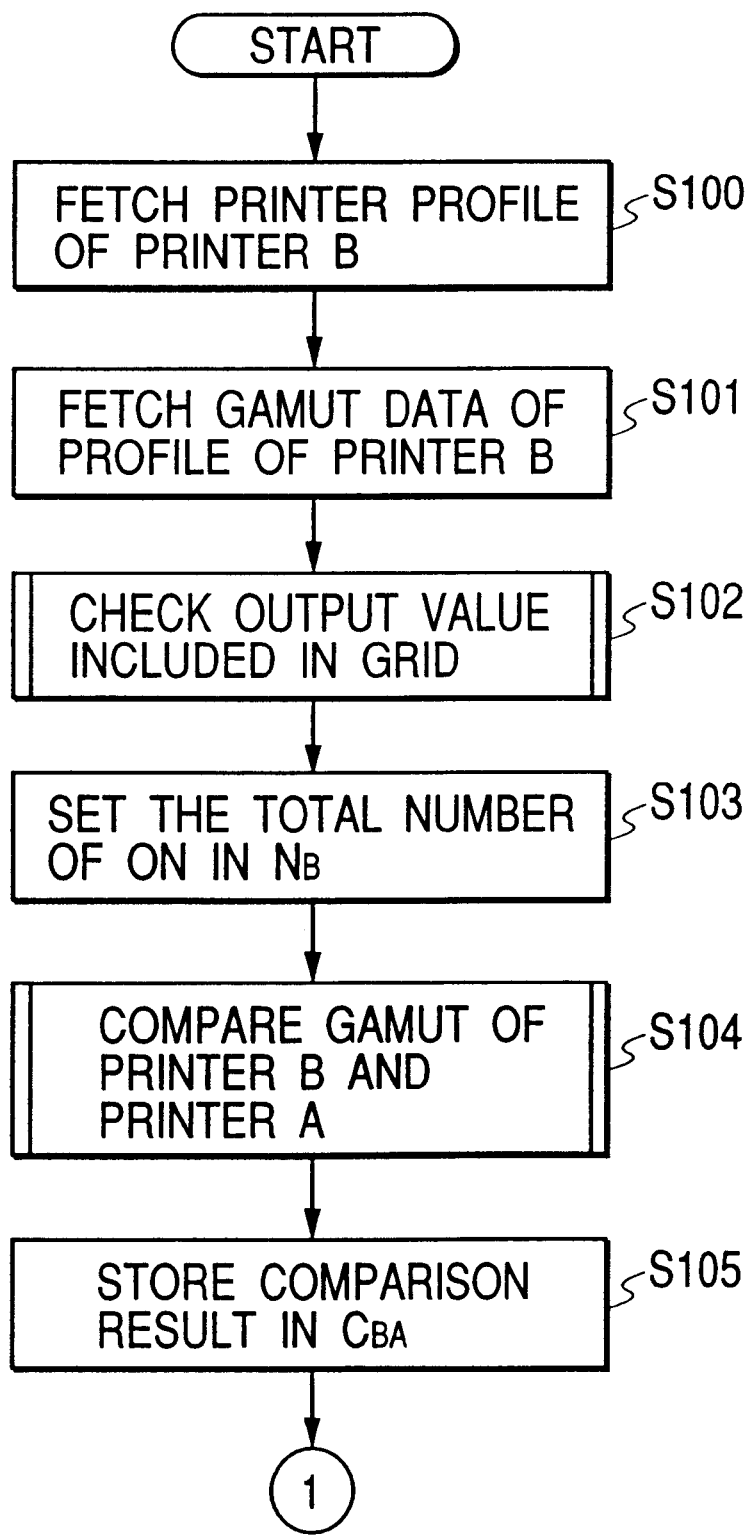
FIG. 10 is a flow chart illustrating a process of selecting an optimum proof printer.
Figure 11:
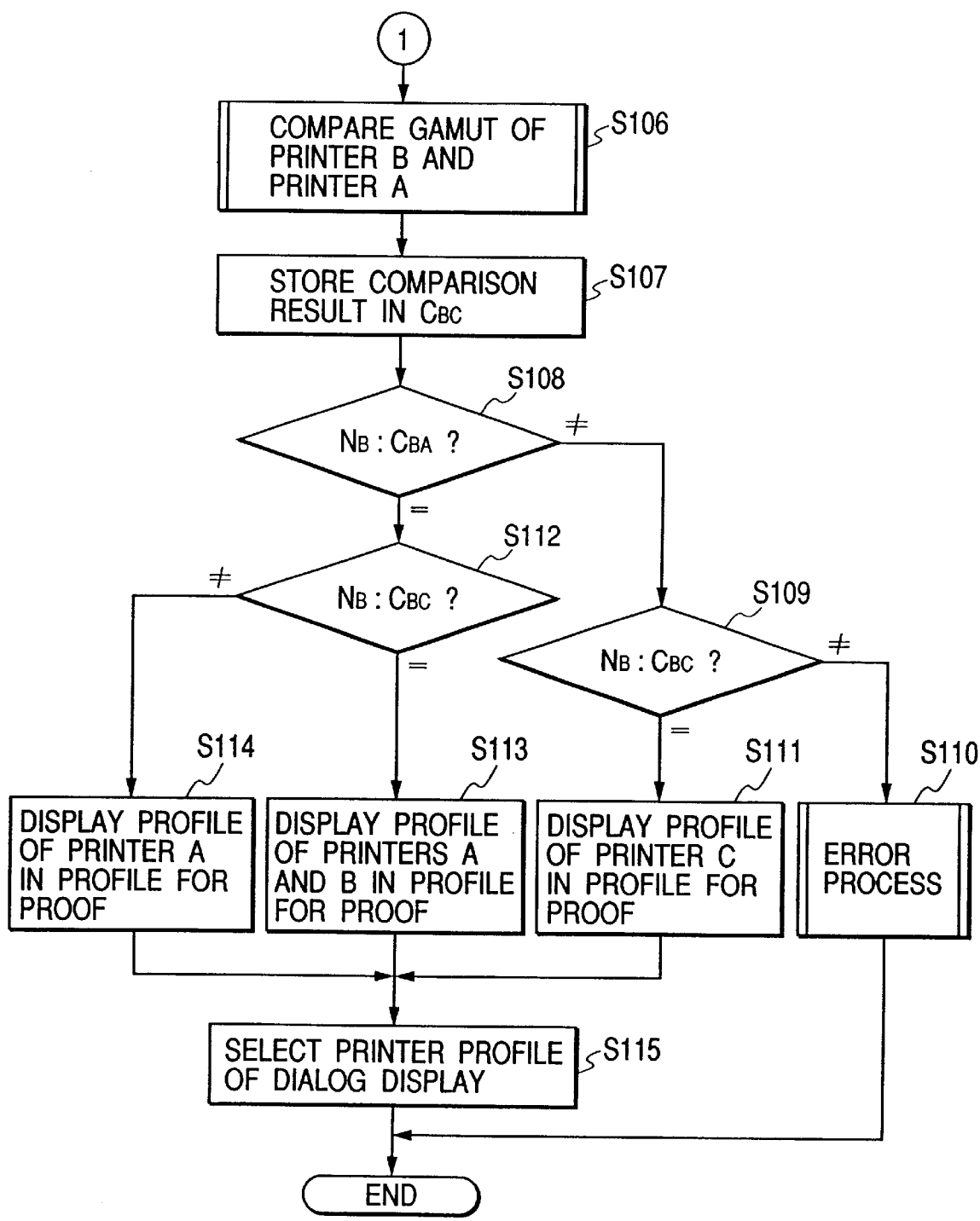
FIG. 11 is a flow chart illustrating a process of selecting an optimum proof printer.

With reference to FIGS. 10 and 11, an automatic proof printer setting process will be described by taking as an example a process of selecting an optimum network printer as the proof printer B from network printers.

At Step S100, the printer profile for the printer B is fetched from the profile storing unit 18 to follow Step S101.

At Step S101, gamut data is picked up from the profile fetched at Step S100 to follow Step S102.

At Step S102, the output value at each grid contained in the gamut tag data is checked to calculate the total number of ON's (the total number of grids in the color reproduction range) to follow Step S103.

This total number is used as an index indicating the size of the gamut of the printer B (the larger the number of ON's, the broader the gamut range).

At Step S103, the total number of ON's checked at Step S102 is set to $N_B$ to follow Step S104.

At Step S104 the size of the gamut of the printer B is compared with the size of the gamut of the printer A to check the common area of the two gamuts to follow Step S105.

At Step S105, the common area checked at Step S104 is set to $C_{BA}$ to follow Step S106.

At Step S106, the size of the gamut of the printer B is compared with the size of the gamut of the printer C to check the common area of the two gamuts to follow Step S107.

At Step S107, the common area checked at Step S106 is set to $C_{BC}$ to follow Step S108.

At Step S108, the values of $N_B$ and $C_{BA}$ are compared with each other. If the values of $N_B$ and $N_{BA}$ are not equal, the flow advances to Step S109 whereat the values $N_B$ and $N_{BC}$ are compared with each other.

If it is judged at Step S109 that the values of $N_B$ and $C_{BC}$ are not equal, both the printers A and C cannot include the gamut of the printer B. In this case, the flow advances to Step S110 whereat an error process is performed.

Figure 7:
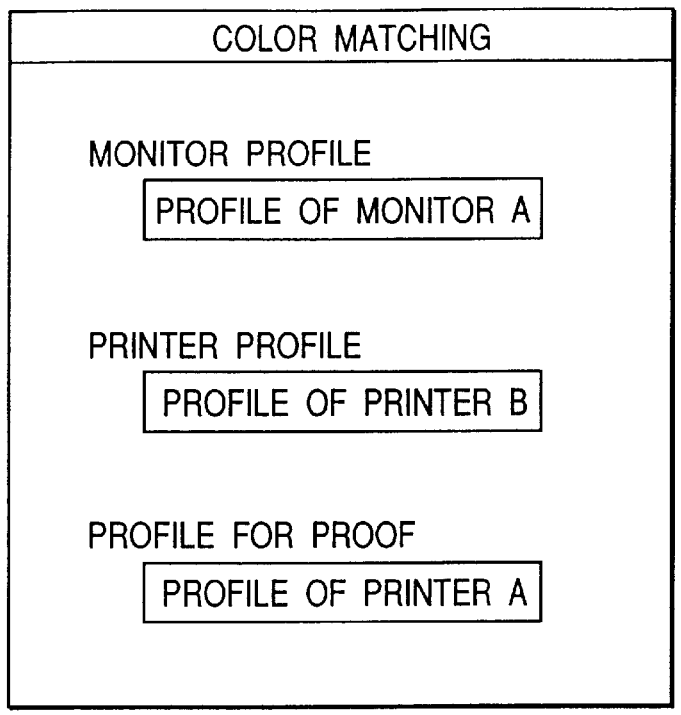
FIG. 7 shows an example of a print dialog displayed by application software 19.

If it is judged at Step S109 that the values of $N_B$ and $C_{BC}$ are equal, the printer C can include the gamut of the printer B. In this case, the flow advances to Step S111 whereat the profile of the printer C is displayed as the proof printer for the printer B, such as shown in FIG. 7, to thereafter follow Step S115.

If it is judged at Step S108 that the values of $N_B$ and $C_{BC}$ are not equal, the flow advances to Step S112 whereat the values of $N_B$ and $C_{BC}$ are compared with each other.

At Step S112, if it is judged that the value of $N_B$ and $C_{BC}$ are not equal, since it is already confirmed that both the printers A and B can include the gamut of the printer B, the flow advances to Step S114 whereat the profile of the printer A is displayed as the proof printer for the printer B to follow Step S115.

If it is judged at Step S112 that the values of $N_B$ and $C_{BC}$ are equal, both the printers A and C can include the gamut of the printer B. In this case, the flow advances to Step S113 whereat both the profiles of the printers A and C are displayed as the proof printers for the printer B to follow Step S115.

At Step S115, the printer profile or profiles displayed at Step S111, S113 or S114 is selected to terminate the process. A user is urged to select either one of the profiles of the printers A and C displayed at Step S113. After the printer profile is selected by the user, the process is terminated.

A priority order of network printers may be designated by a user to automatically select one printer having a higher priority order when a plurality of printers can be used as the proof printer such as in the case of Step S113.

As described above, when the application software 19 selects the printer B on the network system in order to print color data and simulates the output results of the printer B through a color matching process on another network printer, an optimum printer among the other printers A and C can be selected as the proof printer.

Figure 1:
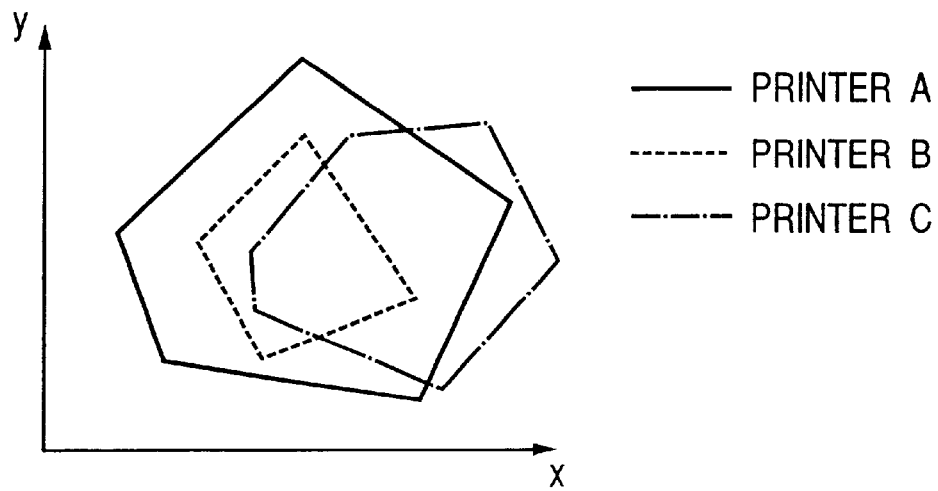
FIG. 1 is a diagram showing an example of color reproduction ranges of color printers.
Figure 2:
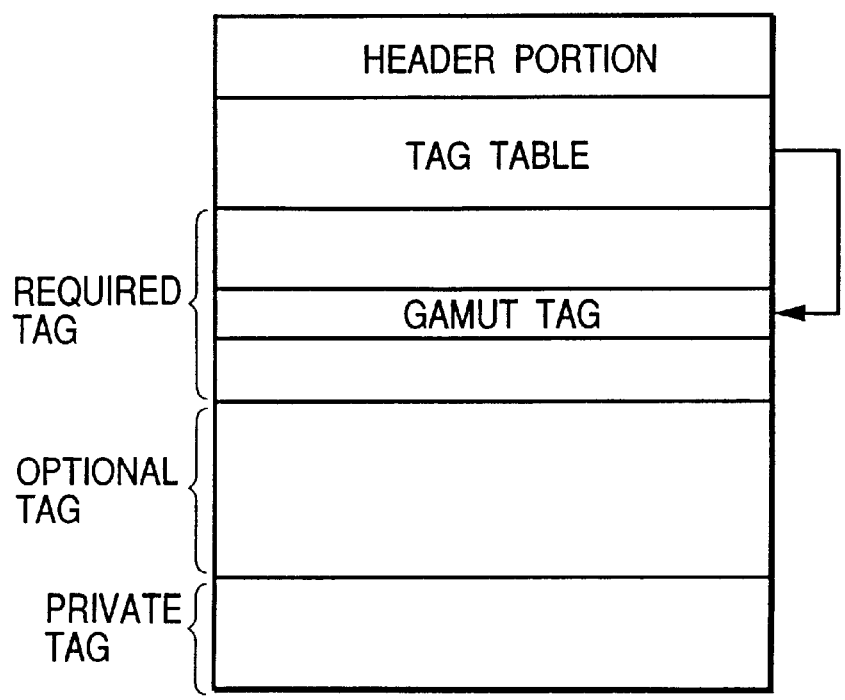
FIG. 2 is a diagram showing an example of the structure of a printer profile in conformity with the profile specification of ICC.

In the example of the gamut information of the printers A, B and C shown in FIG. 1, the above-described process selects and displays the profile of the printer A, such as shown in FIG. 7.

Figure 12:
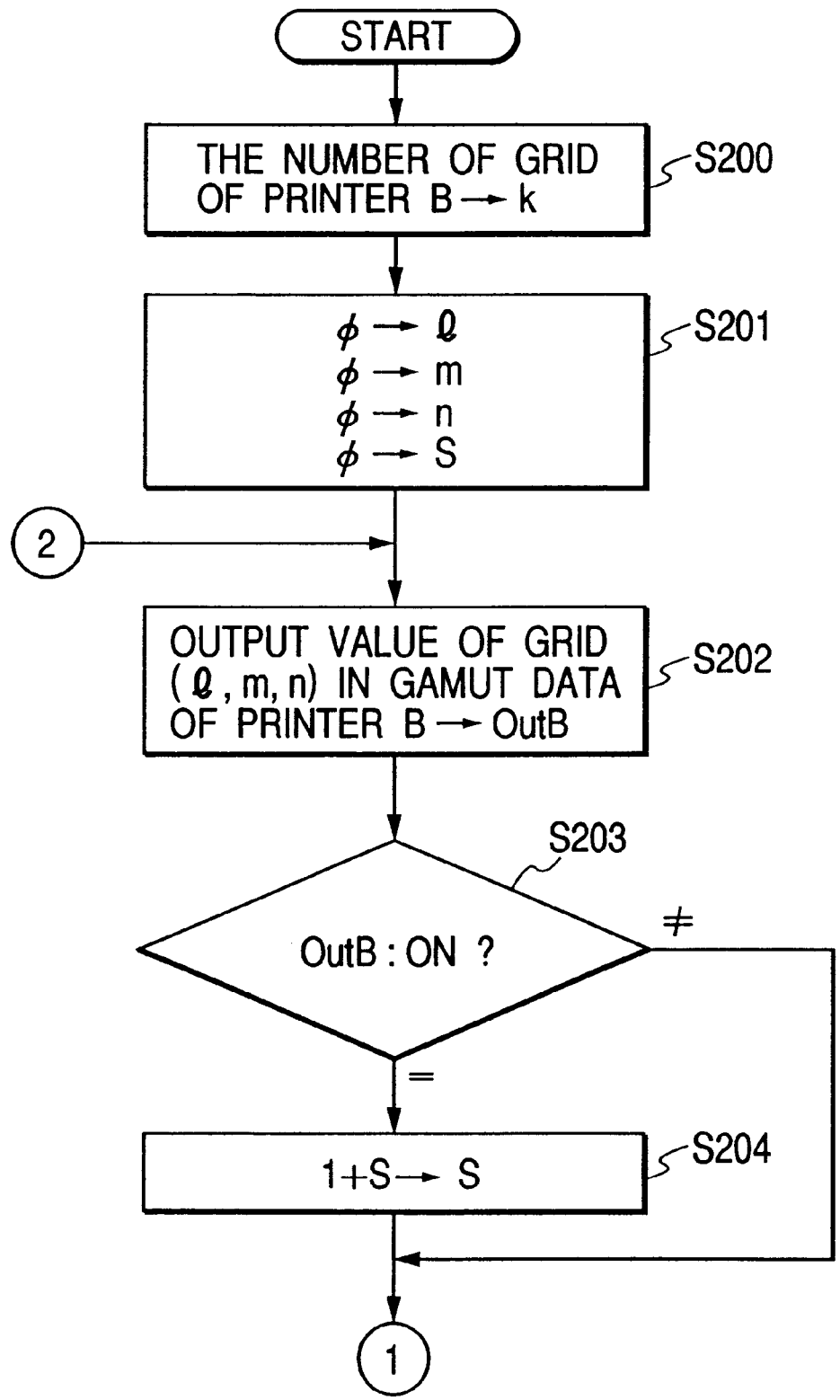
FIG. 12 is a flow chart illustrating the details of Step S102 shown in FIG. 10.
Figure 13:
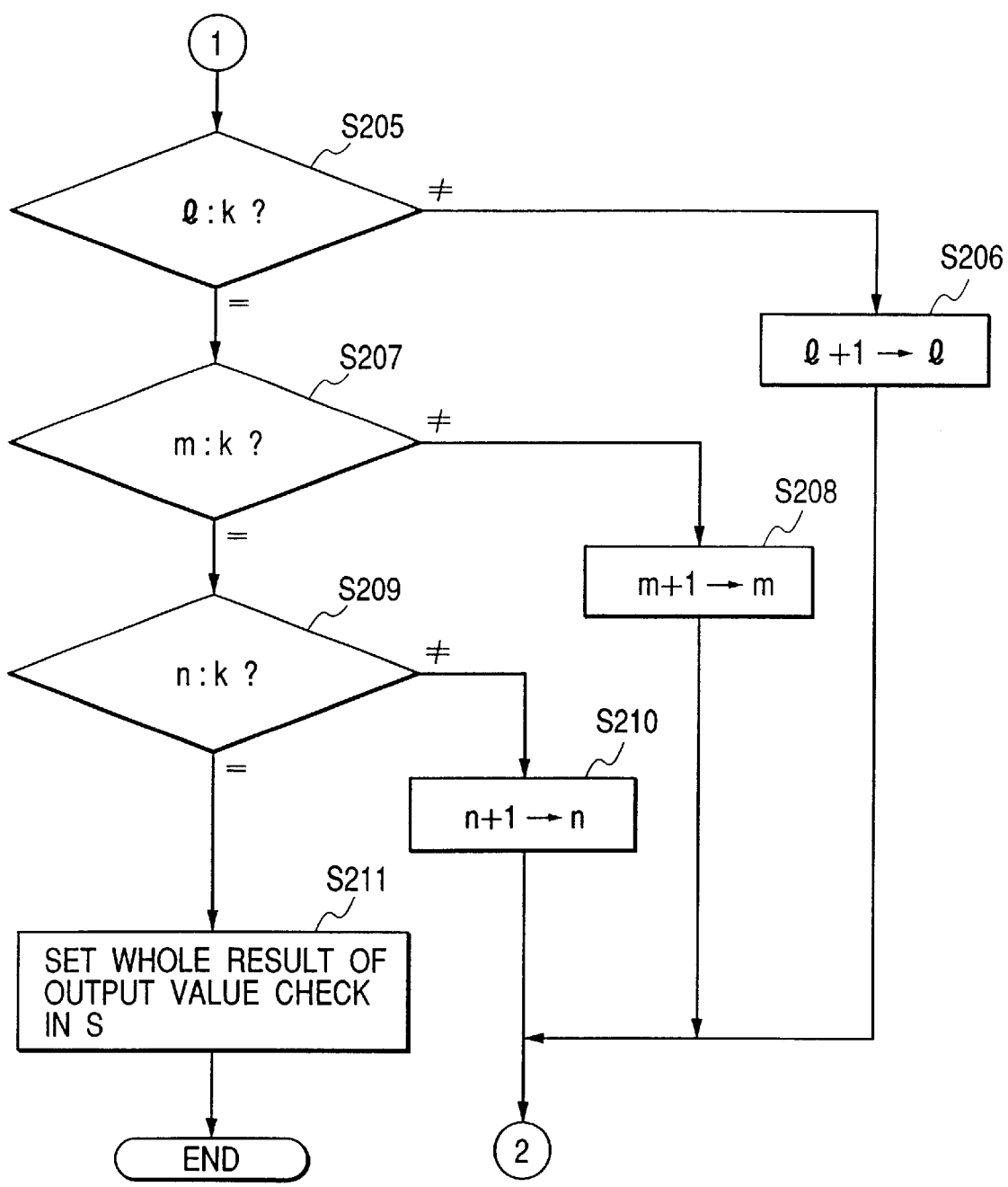
FIG. 13 is a flow chart illustrating the details of Step S102 shown in FIG. 10.

FIGS. 12 and 13 are flow charts illustrating the details of Step S102 shown in FIG. 10.

At Step S200 the number of grids of the gamut tag data in the profile of the printer B is set to k (constant) to follow Step S201.

Figure 3:
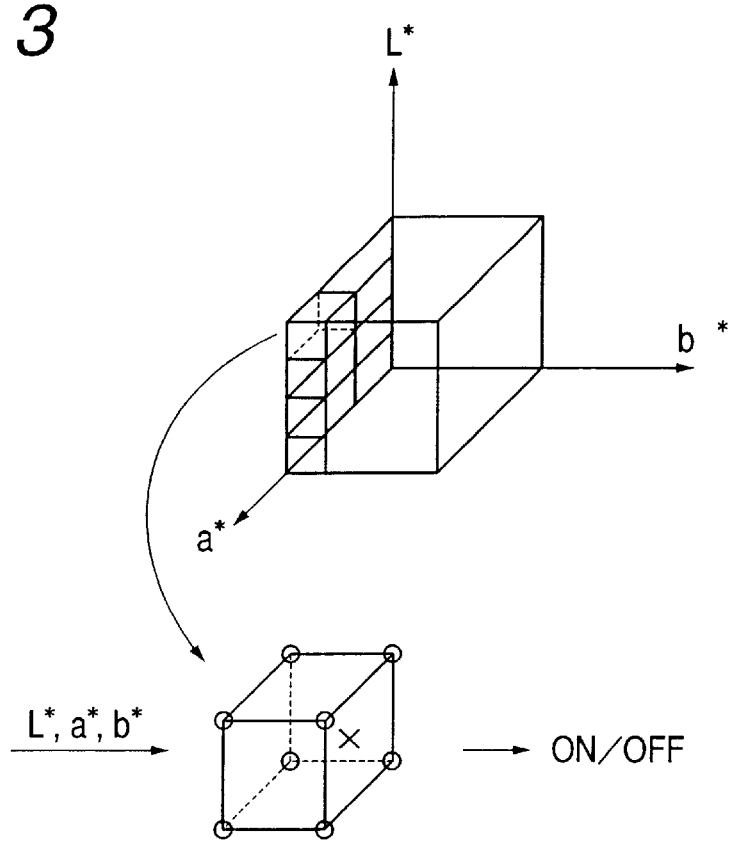
FIG. 3 is a diagram illustrating the structure of gamut tag data.
Figure 4:
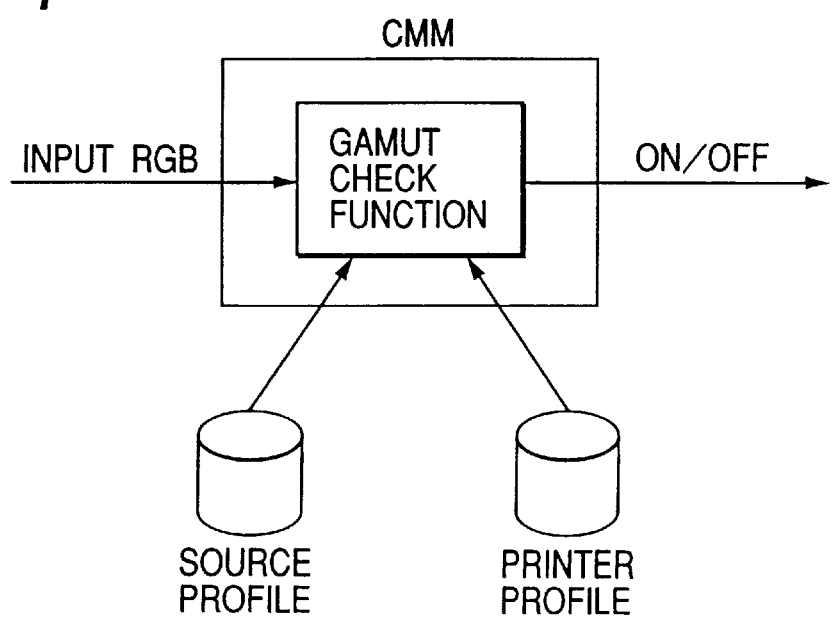
FIG. 4 is a diagram illustrating a gamut check function of CMM.
Figure 5:
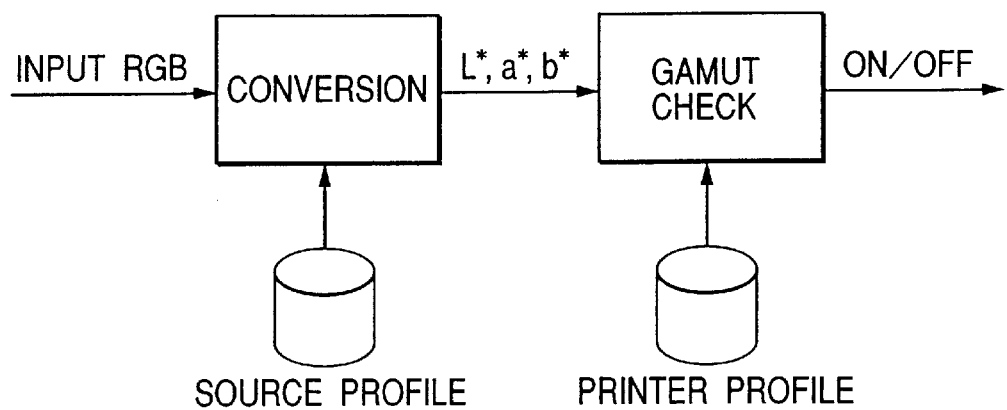
FIG. 5 is a diagram illustrating the details of the process to be executed by a gamut check function described with FIG. 4.
Figure 6:
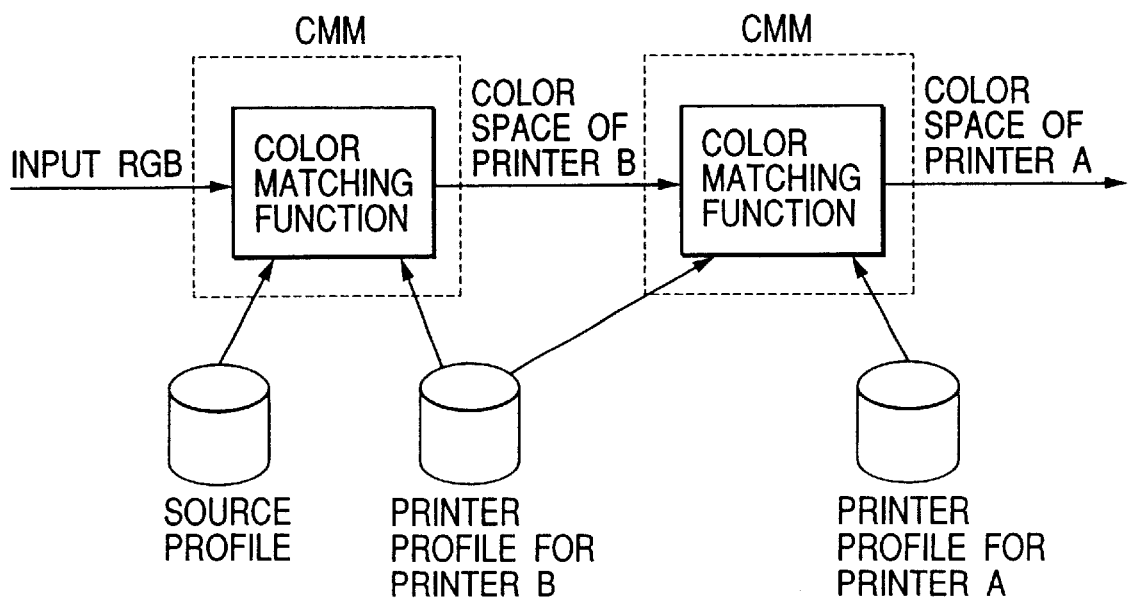
FIG. 6 is a diagram illustrating a print proof process using the function of CMM.

In this embodiment, as shown in FIG. 3, the gamut tag data is stored in a three-dimensional table having three input components (l, m, n).

At Step S201, the variables l, m, n and s are set with "0" to follow Step S202.

At Step S202, output values of grids (l, m, n) in the gamut tag data are set to OutB to follow Step S203.

At Step S203, the value of OutB is checked. If the value of OutB is not ON, the flow advances to Step S205, whereas if the value of OutB is ON, the flow advances to Step S204 whereat s is incremented by "1" to follow Step S205.

At Step S205, the value of l is checked.

If the value of l is different from the value of k, the flow advances to Step S206 whereat the value of l is incremented by "1" to return to Step S202.

If the values of l and k are equal, the flow advances to Step S207 whereat the value of m is checked. If the values of m and k are different, the flow advances to Step S208 whereat the value of m is incremented by "1" to return to Step S202.

If the values of m and k are equal, the flow advances to Step S209 whereat the value of n is checked. If the values of n and k are different, the flow advances to Step S210 whereat the value of n is incremented by "1" to return to Step S202.

If the values of n and k are equal, the flow advances to Step S211 whereat the value of s is reserved as the result of the whole output value check, and thereafter the flow is terminated.

With the above process, the index indicating the size of the gamut of the printer B can be obtained (the larger the value of s, the broader the gamut of the printer B).

Figure 14:
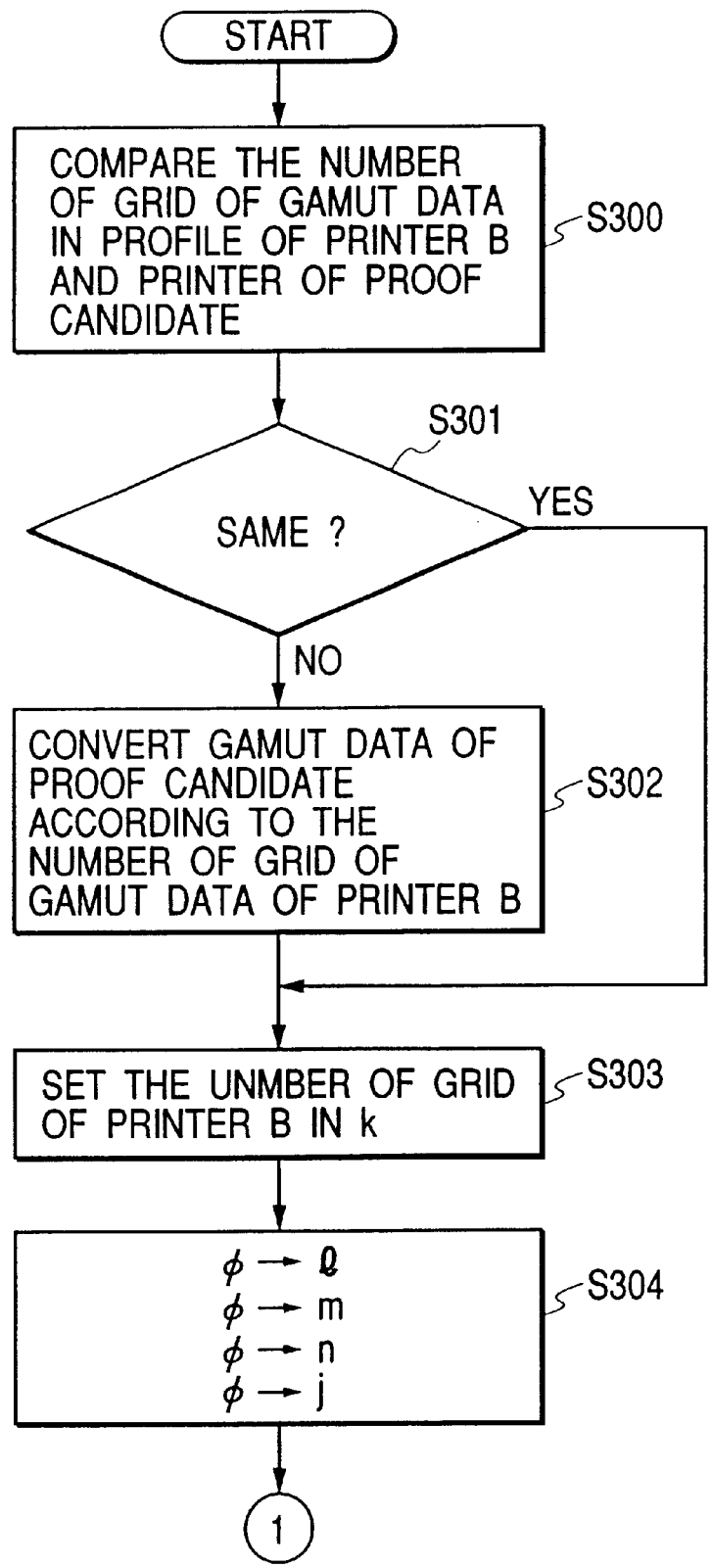
FIG. 14 is a flow chart illustrating the details of Step 104 shown in FIG. 10 and Step S106 shown in FIG. 11.
Figure 15:
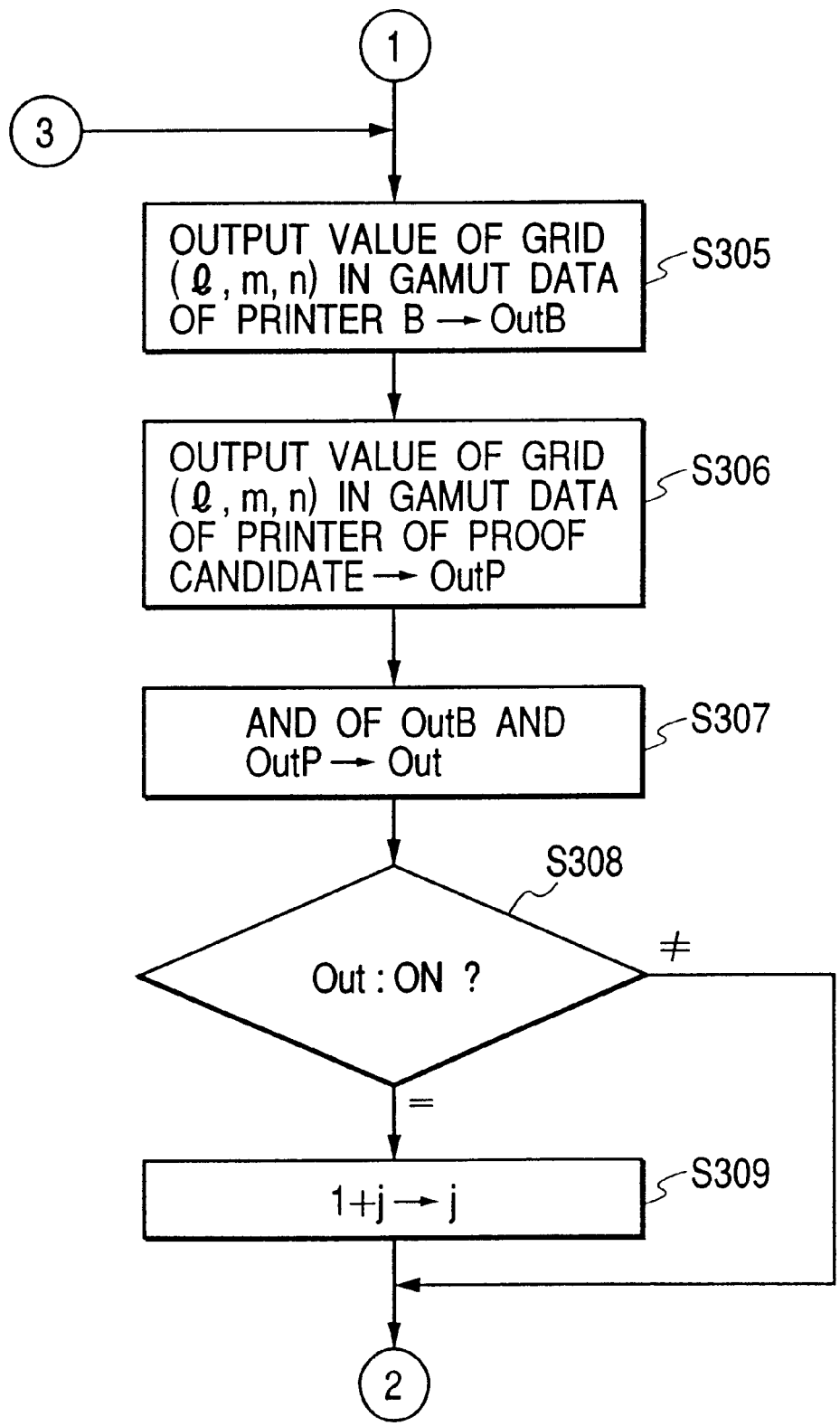
FIG. 15 is a flow chart illustrating the details of Step 104 shown in FIG. 10 and Step S106 shown in FIG. 11.
Figure 16:
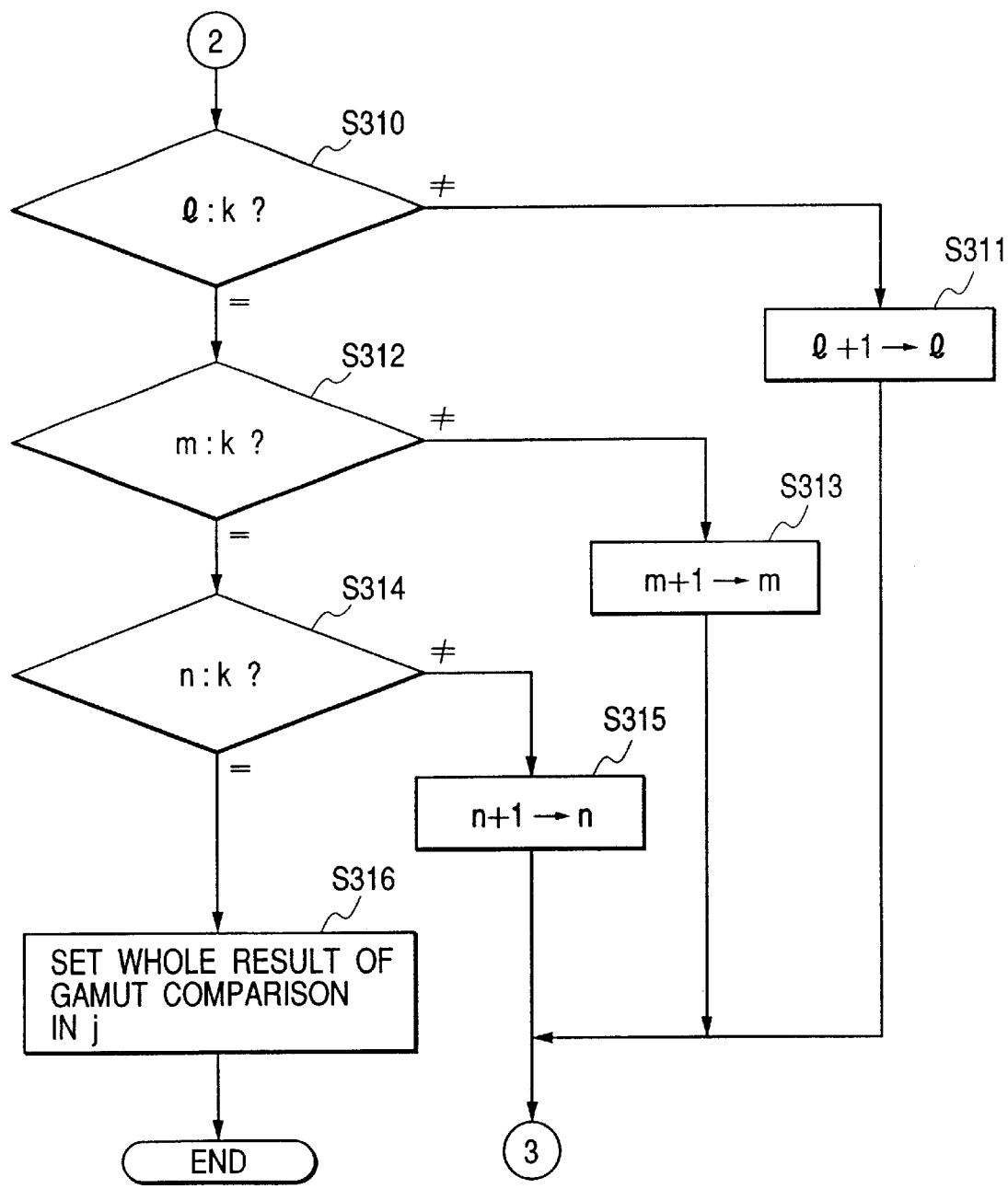
FIG. 16 is a flow chart illustrating the details of Step 104 shown in FIG. 10 and Step S106 shown in FIG. 11.

FIGS. 14 to 16 are flow charts illustrating the details of Step S104 shown in FIG. 10 and Step S106 shown in FIG. 11.

At Step S300, the number of grids of the gamut data in the profile of the printer B is compared with the number of grids of the gamut data in the profile of a proof printer candidate of other printers (in this embodiment, printer A or C) to follow Step S310.

At Step S301, if the comparison result at Step S300 indicates that the numbers of grids are equal, the flow advances to Step S303.

At Step S301, if the comparison result at Step S300 indicates that the numbers of grids are not equal, the flow advances to Step S302 whereat the number of grids of the gamut data in the profile of the proper printer candidate is converted into the number of grids of the gamut data of the printer B to follow Step S303. By using an interpolation process described with conventional techniques, grid data is calculated to form new gamut tag data having the number of grids of the printer B at Step S302. In this manner, the numbers of grids of the gamut data of the printer B and proof printer candidate can be made equal, so that the processes described with FIGS. 12 and 13 can be performed.

At Step S303, the number of grids of the gamut data of the printer B is set to k (constant) to follow Step S304.

At Step S304, the variables l, m, n, j are set with "0" to follow Step S305.

At Step S305, output values of grids (l, m, n) in the gamut data of the printer B are set to OutB to follow Step S306.

At Step S306, output values of grids (l, m, n) in the gamut data of the proof printer candidate are set to OutP to follow Step S307.

At Step S307, an AND operation is performed between OutB and OutP and the result is set to Out.

At Step S307, the value of Out is checked.

If the value of Out is not ON, the flow advances to Step S310, whereas if the value of Out is ON, the flow advances to Step S309 whereat the value of j is incremented by "1" to follow Step S310.

At Step S310, the value of l is checked. If the values of l and k are different, the flow advances to Step S311 whereat the value of l is incremented by "1" to return to Step S305.

If the values of l and k are equal, the flow advances to Step S312 whereat the value of m is checked. If the values of m and k are different, the flow advances to Step S313 whereat the value of m is incremented by "1" to return to Step S305.

If the values of m and k are equal, the flow advances to Step S314 whereat the value of n is checked. If the values of n and k are different, the flow advances to Step S315 whereat the value of n is incremented by "1" to return to Step S305.

If the values of n and k are equal, the flow advances to Step S316 whereat the value of j is reserved as the result of the whole output value check, and thereafter the flow is terminated.

With the above process, the index indicating the size of a common area of the gamuts of the printer B and proof printer candidate can be obtained (the larger the value of j, the broader the common area. The value of k is the maximum value of j).

Figure 17:
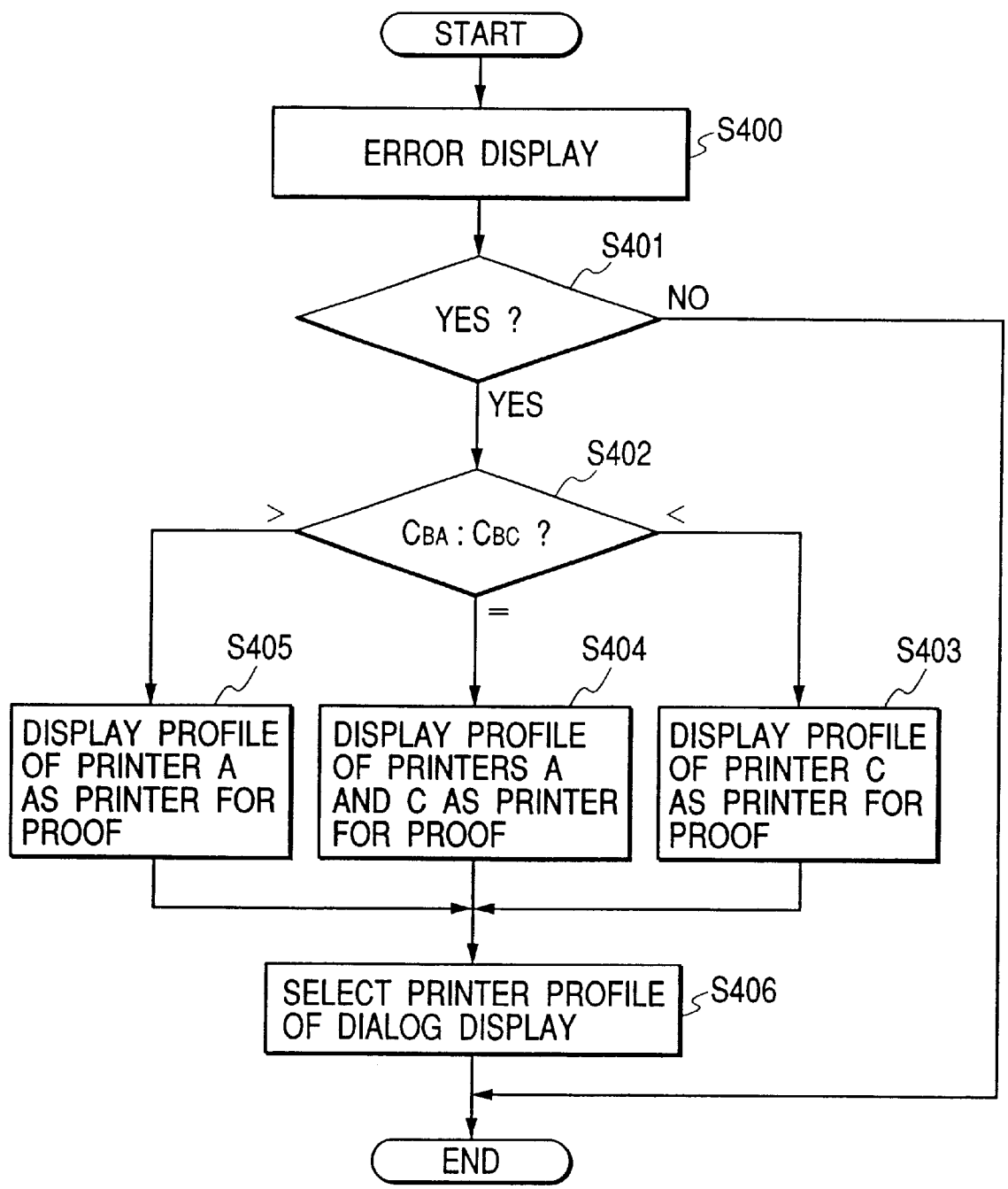
FIG. 17 is a flow chart illustrating the details of Step S110 shown in FIG. 11.

FIG. 17 is a flow chart illustrating the details of Step S110 shown in FIG. 11.

Figure 18:
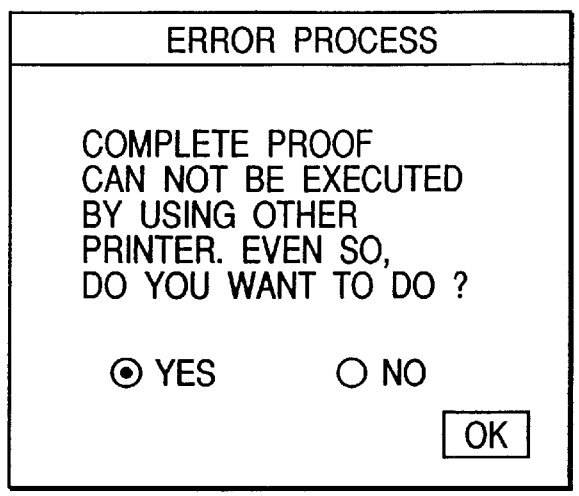
FIG. 18 shows a dialog for an error process display at Step S400 shown in FIG. 17.

At Step S400 an error process dialog shown in FIG. 18 is displayed to follow Step S401. Specifically, this dialog indicates that the display results of the printer B cannot be simulated correctly by another printer.

If NO is selected relative to an inquiry "EVEN SO, DO YOU WANT TO DO ?" at Step 401, the process is terminated.

If YES is selected, the flow advances to Step S402 whereat the values of $C_{BA}$ and $C_{BC}$ are compared with each other.

If the value of $C_{BC}$ is larger than the value of $C_{BA}$, it means that the printer C has a broader common area than the printer A with respect to the printer B. Therefore, it is displayed that the profile of the printer C is used as the profile of the proof printer, such as shown in FIG. 7, to thereafter follow Step S406.

If the value of $C_{BC}$ is equal to the value of $C_{BA}$, it means that both the printers C and A have the same common area with respect to the printer B. Therefore, it is displayed that the profiles of the printers A and C are used as the profile of the proof printer to thereafter follow Step S406.

If the value of $C_{BC}$ is smaller than the value of $C_{BA}$, it means that the printer A has a broader common area than the printer C with respect to the printer B. Therefore, it is displayed that the profile of the printer A is used as the profile of the proof printer, such as shown in FIG. 7, to thereafter follow Step S406.

At Step S406, a printer profile displayed at Step S403, S404, S405 is selected to terminate the process.

FIG. 18 shows an example of an error process dialog at Step S400 shown in FIG. 17.

As described above, if the display results cannot be simulated with a high precision, this effect is notified to a user to make the user give a judgement. The user can determine whether or not the proof output is made, in accordance with the use application of print data.

For example, if a user requests for a high precision proof, an output of a proof image which is not highly precise can be avoided and wasteful cost can be reduced.

If a highly precise proof image cannot be made, this effect is notified to a user so that the user can know the reliability of the proof output.

(Modification of First Embodiment)

In the first embodiment, in the error process dialog at Step S400 shown in FIG. 17, only a notice is displayed to the effect that a perfect proof is impossible with another printer.

In this modification, however, indices indicating the imperfectness degrees are displayed additionally.

The printer selected in accordance with these indices is used as a proof printer.

Figure 20:
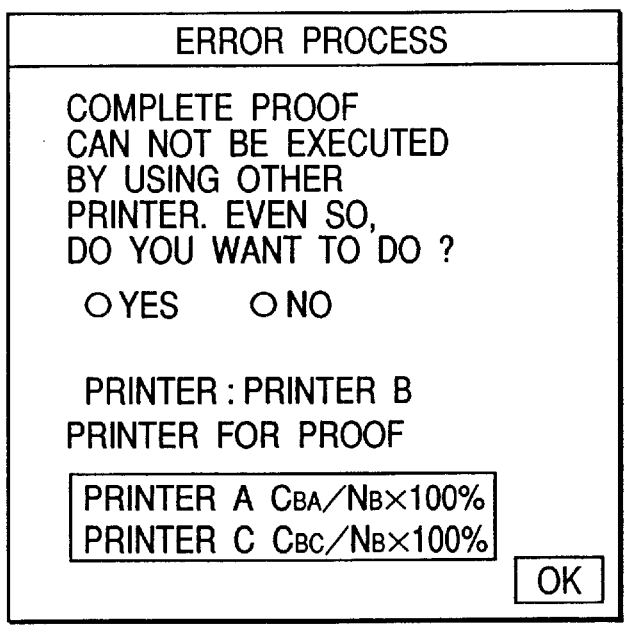
FIG. 20 shows a modification of a dialog for an error process display.

With reference to FIG. 20, an error process dialog according to the modification of the first embodiment will be described.

A different point of FIG. 20 from FIG. 18 is that the error process dialog gives the details of indices indicating the imperfectness degree of each network printer.

In the error process dialog of this modification, the name of the printer selected by the dialog shown in FIG. 19, from which printer a final image is to be output, and a list of the indices indicating the imperfectness degrees of candidate proof printers, are displayed.

For example, assuming that the output device for outputting the final image is the printer B and the candidate proof printers are the printers A and C as in the first embodiment, then a percentage of $C_{BA}$ relative to $N_B$ and a percentage of $C_{BC}$ relative to $N_B$ are used as the imperfectness indices.

A desired printer is selected from the list of indices and used as a proof printer.

With this modification, a user can confirm the imperfectness degree in advance when the highly precise proof process is impossible.

Since the proof printer can be selected from the list of indices indicating the imperfect degrees, a desired proof printer can be selected by considering other factors such as installation positions of printers, when the highly precise proof process is impossible.

Second Embodiment

Figure 21:
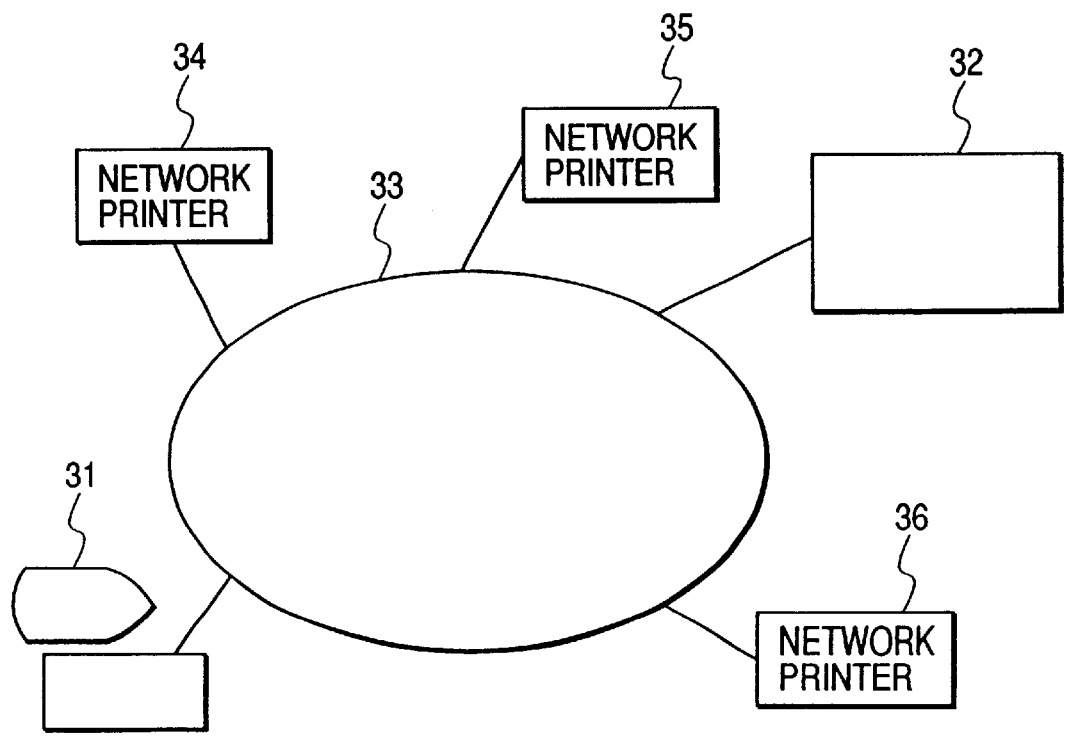
FIG. 21 is a diagram showing the configuration of a network system according to a second embodiment of the invention.

FIG. 21 is a diagram showing the configuration of a network system according to a second embodiment of the invention.

As shown in FIG. 21, the network system of the second embodiment is constituted of a client PC 31, a network server 32, network printers 34, 35 and 36, and a network 33 interconnecting these five devices.

The network server 32 has a CPU, a RAM, a hard disc drive and the like necessary for image processing and print processing and a communication function necessary for communications over the network.

The network printers 34, 35 and 36 are assumed to be in correspondence with the printers A, B and C.

Figure 22:
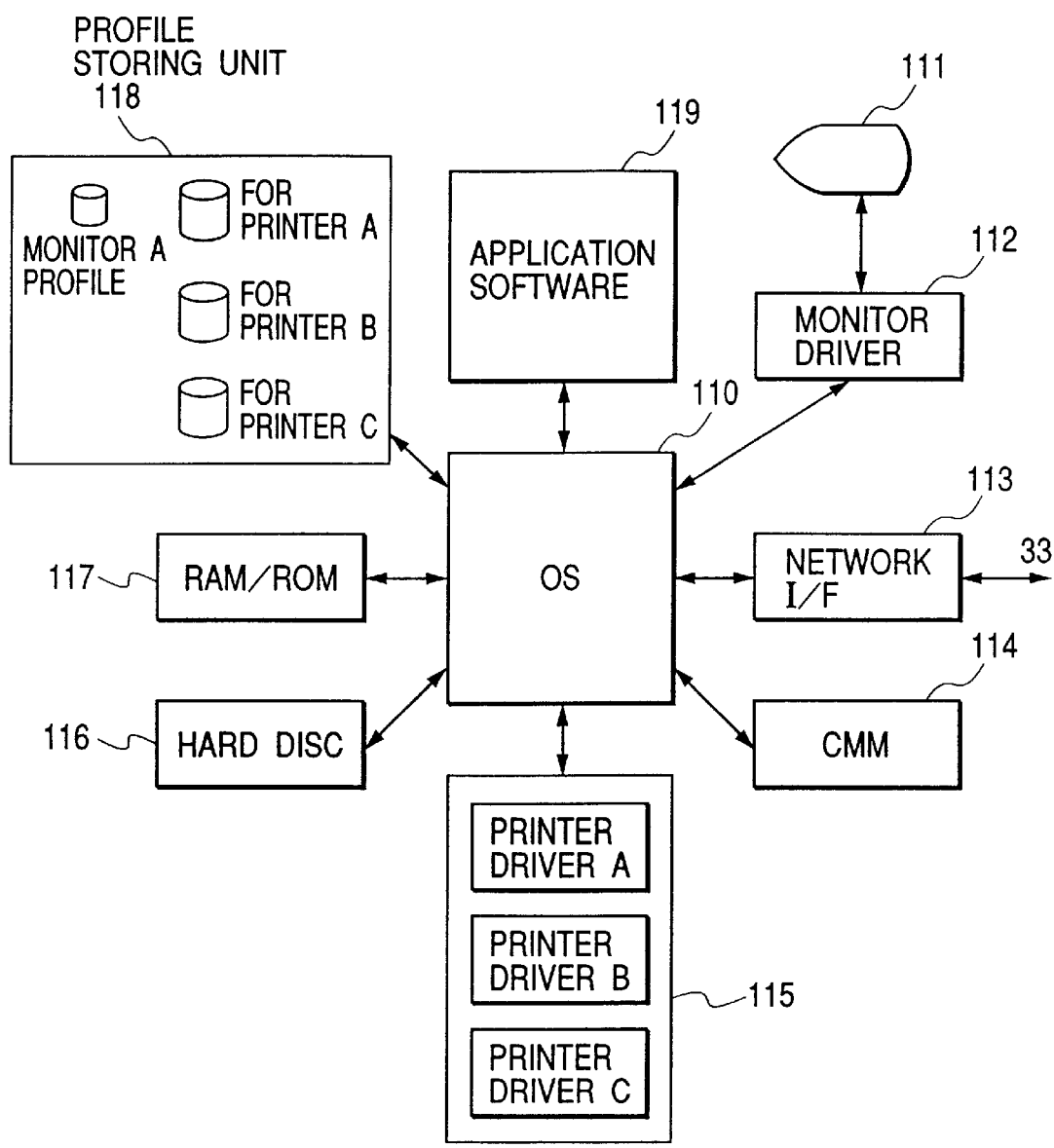
FIG. 22 is a diagram showing the structure of a client PC 31 shown in FIG. 21.

FIG. 22 is a diagram showing the structure of the client PC 31 shown in FIG. 21. As shown in FIG. 22, the client PC 31 has: a CPU, a VRAM and the like necessary for monitor display and image processing: an OS (operating system) 110 for providing a fundamental function necessary for the operation of software such as application software; a monitor 111; a monitor driver 112 for controlling monitor display, a network I/F 113 for connection of the PC 31 to the network 33; a CMM (Color Management Module) 114 which is a module for executing a color matching process; a printer driver storing unit 115 for storing printer drivers A, B and C of the network printers A, B and C; a hard disc drive 116; a RAM/ROM 117 used as a working memory by an application and OS for the color matching process and the like; a profile storing unit 118 for storing printer profiles A, B and C of the network printers A, B and C, a monitor profile A of the monitor 111 and the like; and application software 119 for forming or managing color documents.

FIGS. 23 and 24 show examples of print dialogues displayed by the application software 113.

In the example shown in FIG. 23, a user manually selects an important point in color print reproduction. In this example, either "ATTACH IMPORTANCE TO IMAGE OUTPUT" or "ATTACH IMPORTANCE TO OUTPUT OF DRAWING/CHARACTER" is selected.

In the example shown in FIG. 24, a dialog shows the name of a printer selected from network printers in accordance with the selection result shown in FIG. 23.

Figure 25:
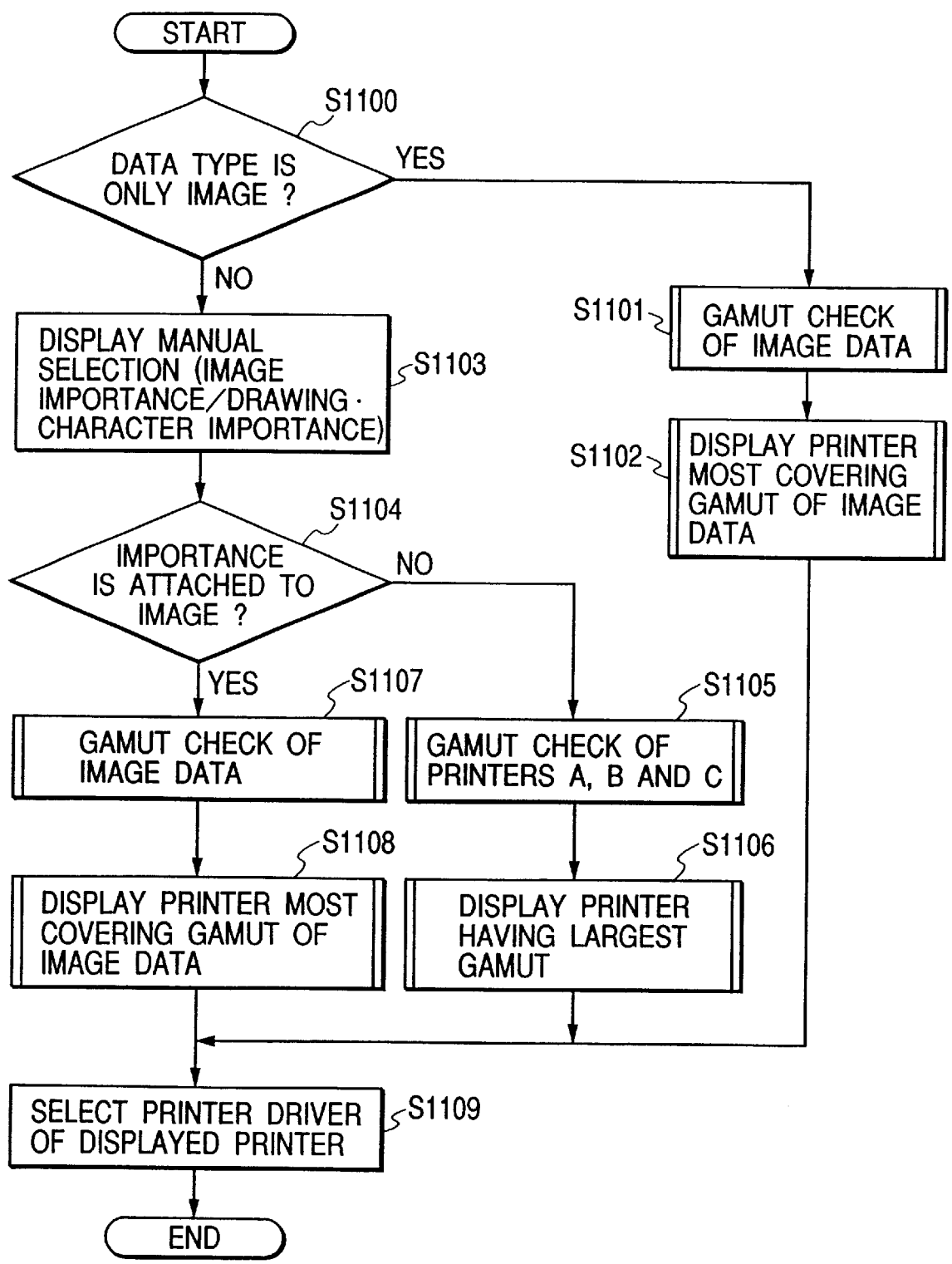
FIG. 25 is a flow chart illustrating a process of selecting an optimum network printer and a corresponding printer driver while taking into consideration the color reproduction ability of each network printer matching the data type of document data when a color document is printed by using the application software 119.

FIG. 25 is a flow chart illustrating a process of selecting an optimum network printer and a corresponding printer driver while taking into consideration the color reproduction ability of each network printer with respect to the type of document data when a color document is printed by using the application software 119.

First, at Step S1100, the type of color document data is checked.

The type of color document data can be checked from the data format of each object image contained in a color document. For example, an image of the color document is written by a bit map format, and a drawing is written with vector information, and a character is written with a character code.

Alternatively, the contents of a color document may be analyzed by dividing it into areas and judging the type of each area. In analyzing the contents of a color document, a histogram may be used.

If the data type is an image, the flow advances to Step S1101 whereat an output ability degree of the image data by each printer A, B, C is checked from gamut data to follow Step S1102.

More specifically, an output ability degree of the image data by each printer A, B, C is checked to select a printer having the broadest gamut and highest color reproduction ability with respect to the image data.

At Step S1102, a printer most covering the gamut (color reproduction range) with respect to the image data and selected in accordance with the check at Step S1101 is displayed as shown in FIG. 24 to follow Step S1109. Namely, a printer which can reproduce the image data with highest fidelity is selected and displayed.

If it is judged at Step S1100 that the data type is not an image (including drawings, characters or the like), the flow advances to Step S1103 whereat a manual selection dialog shown in FIG. 23 is selected to follow Step S1104.

At Step S1104, if "ATTACH IMPORTANCE TO OUTPUT OF DRAWING/CHARACTER" is selected, the flow advances to Step S1105 whereat the output ability degree of each network printer A, B, C with respect to the RGB characteristics of the monitor 111 of the client PC is checked from each gamut to follow Step S1106.

More specifically, the color data of drawing/character changes with the monitor characteristics. Therefore, the output ability degree of each network printer A, B, C with respect to the RGB characteristics of the monitor 111 is checked and the printer having the broadest gamut and largest color reproduction ability relative to the RGB characteristics of the monitor is checked.

At Step S1106, the printer having the broadest gamut and highest color reproduction ability checked at Step S1105 is selected from the network printers A, B and C and the selected printer is displayed as shown in FIG. 24 to follow Step S1109.

If "ATTACH IMPORTANCE TO IMAGE OUTPUT" is selected at Step S1104, the flow advances to Step S1107 whereat an image contained in the color document is extracted, and the output ability degree of each network printer A, B, C with respect to the extracted image is checked from each gamut to follow Step S1108.

More specifically, the output ability degree of each network printer A, B, C with respect to the image to which importance was attached is checked and the printer having the broadest gamut and highest color reproduction ability is checked.

At Step S1108 the printer most covering the gamut (color reproduction range) of the extracted image is selected from the network printers A, B and C in accordance with the check results at Step S1107, and displayed as shown in FIG. 24 to follow Step S1109.

At Step S1109, a printer driver corresponding to the printer displayed at Step S1102, S1106 or S1108 is fetched from the printer driver storing unit 115 to thereafter terminate the process.

As described above, in printing a color document, the application software 119 checks the type of color document data, and if the color document data contains only image data, it automatically selects a network printer most suitable for color reproduction of the image data and selects the corresponding printer driver.

If the color document data is not only image data, a user instructs whether an image is important or a drawing/character is important. The application software automatically selects a network printer most suitable for color reproduction of the color data designated by the user and selects the corresponding printer driver.

Figure 26:
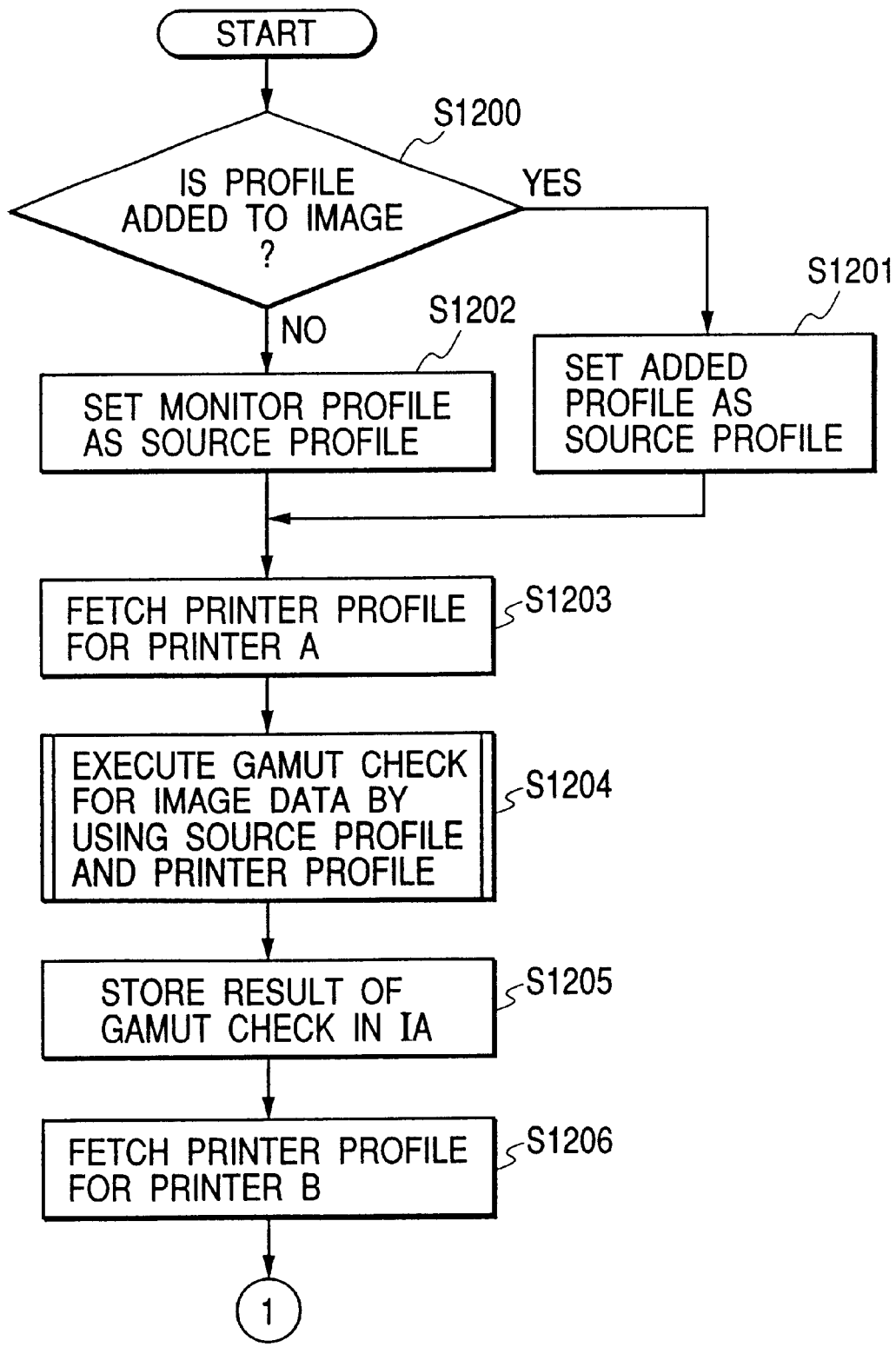
FIG. 26 is a flow chart illustrating the details of Steps S1101 and S1107 shown in FIG. 25.
Figure 27:
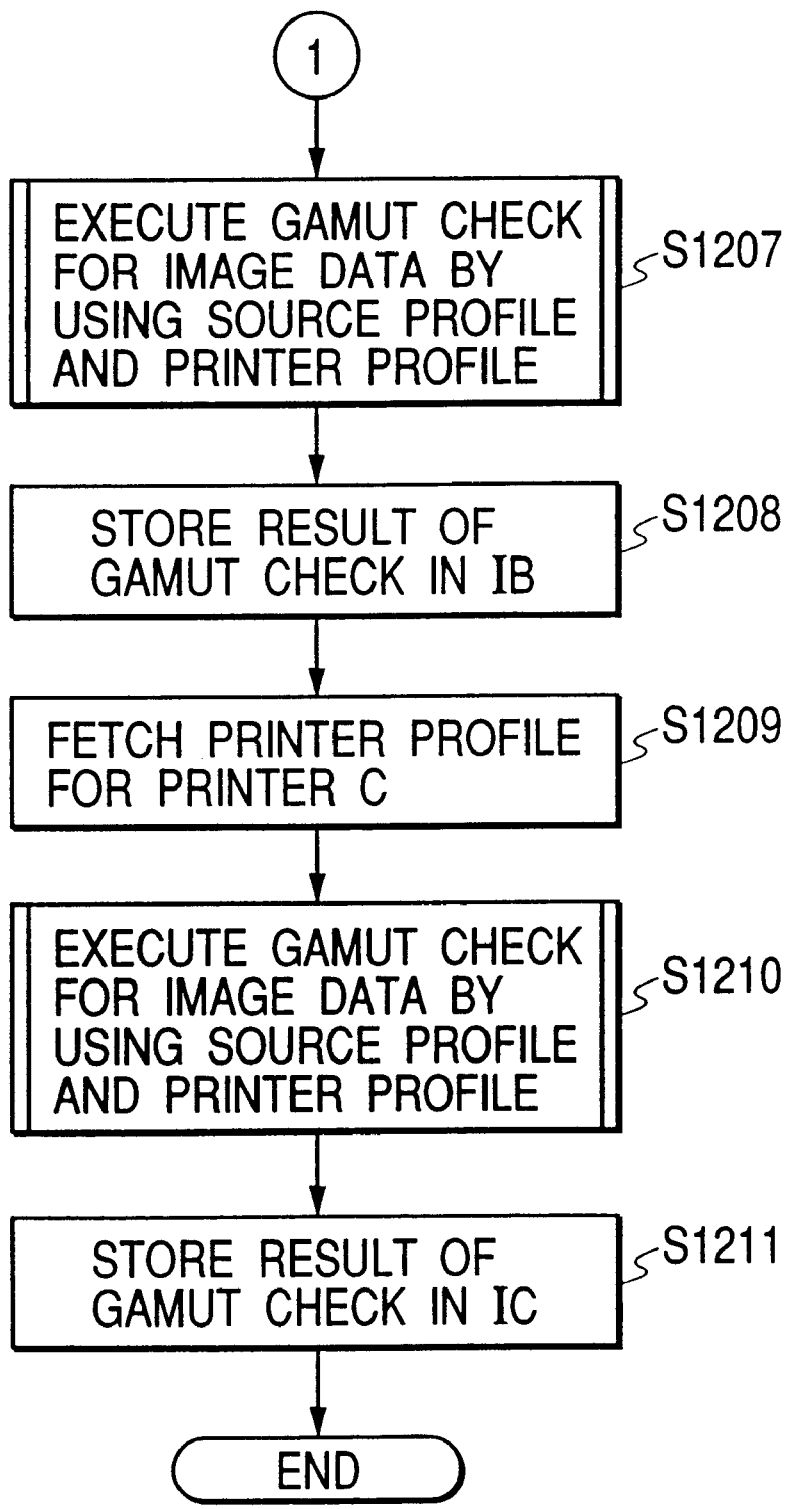
FIG. 27 is a flow chart illustrating the details of Steps S1101 and S1107 shown in FIG. 25.

FIGS. 26 and 27 are flow charts illustrating the details of Steps S1101 and S1107 shown in FIG. 25.

At Step S1200, it is checked whether a profile is added to the extracted image. The profile added to an image is associated with a device which displays the image data of the image, and indicates the characteristics of the image data.

The added profile is generally a profile of a scanner or monitor. If the profile is added, the flow advances to Step S1201 whereat the profile is set as a source profile to follow Step S1203.

If the profile is not added, the monitor profile of the monitor 111 of the client PC is set as the source profile to follow Step S1203.

At Step S1203, the printer profile of the printer A is fetched from the profile storing unit 118 to follow Step S1204.

At Step S1204, a gamut check for image data described with reference to FIG. 19 is executed by using the source profile set at Step S1201 or S1202 and the printer profile fetched at Step S1203, to thereby check the output ability degree (the number of pixels capable of being output) of the image data by the printer A and follow Step S1205.

At Step S1205, the result of the gamut check at Step 1204 is stored in IA (constant) to follow Step S1206.

At Step S1206, the printer profile of the printer B is fetched from the profile storing unit 118 to follow Step S1207.

At Step S1207, a gamut check for image data described with reference to FIG. 19 is executed by using the source profile set at Step S1201 or S1202 and the printer profile fetched at Step S1206, to thereby check the output ability degree (the number of pixels capable of being output) of the image data by the printer B and follow Step S1208.

At Step S1208, the result of the gamut check at Step S1207 is stored in IB (constant) to follow Step S1209.

At Step S1209, the printer profile of the printer C is fetched from the profile storing unit 118 to follow Step S1210.

At Step S1210, a gamut check for image data described with reference to FIG. 19 is executed by using the source profile set at Step S1201 or S1202 and the printer profile fetched at Step S1209, to thereby check the output ability degree (the number of pixels capable of being output) of the image data by the printer C and follow Step S1211.

At Step S1211, the result of the gamut check at Step S1210 is stored in IC (constant) to terminate the process.

As described above, the gamut check for image data is executed and the output ability degrees (numbers of pixels of image data capable of being output) of the network printers A, B and C are stored in IA, IB and IC.

Figure 28:
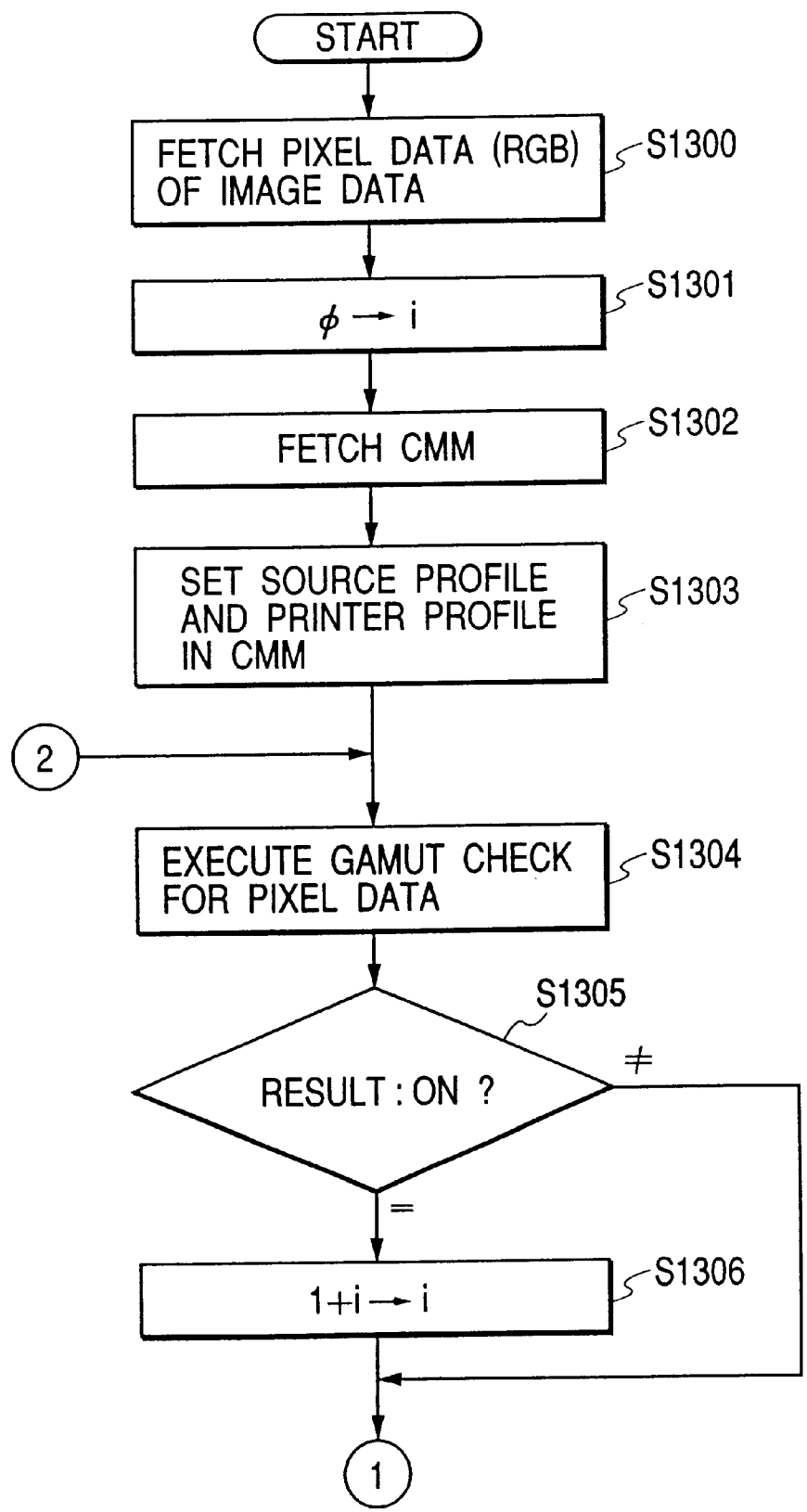
FIG. 28 is a flow chart illustrating the details of Steps S1102 and S1108 shown in FIG. 25.
Figure 29:
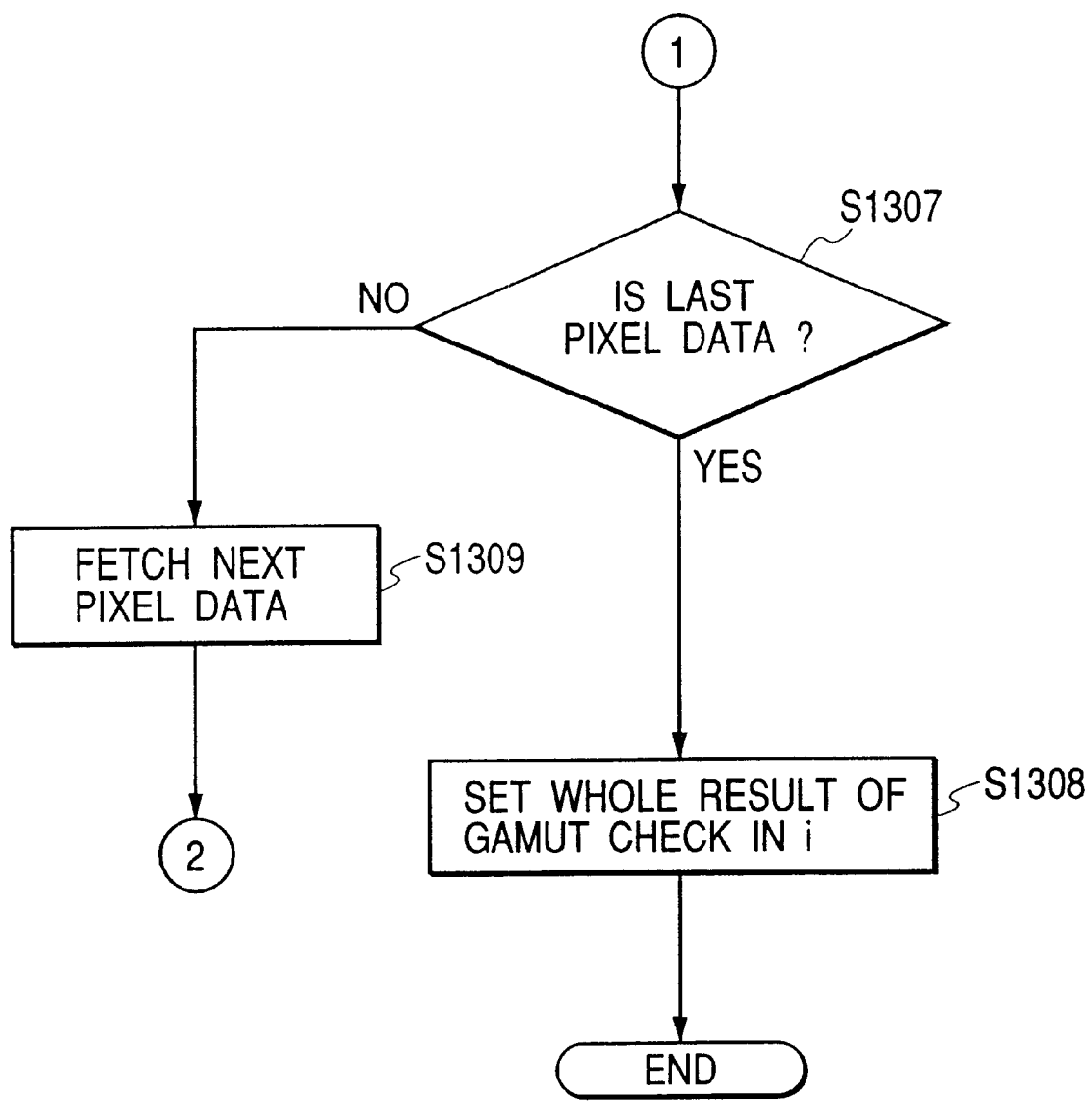
FIG. 29 is a flow chart illustrating the details of Steps S1102 and S1108 shown in FIG. 25.

FIGS. 28 and 29 are flow charts illustrating the details of Steps S1204, S1207 and S1210 shown in FIGS. 26 and 27.

At Step S1300, the first pixel (RGB pixel) data of the image data is fetched to follow Step S1301.

At Step S1301, a variable i is set with "0" to follow Step S1302.

At Step S1302, CMM 114 is fetched to follow Step S1303.

At Step S1303, the source profile and printer profile are set to CMM 114 to follow Step S1304.

At Step S1304, a gamut check for the pixel data of the image fetched at Step S1300 is executed by using the profiles set to CMM 114 to thereafter follow Step S1305.

At Step S1305, the result of the gamut check is checked. If the result is not ON, the flow advances to Step S1307, whereas if ON, the flow advances to Step S1306 whereat i is incremented by "1" to follow Step S1307.

At Step S1307, it is checked whether the pixel data is the last pixel data. If not, the flow advances to Step S1309 whereat the next pixel data is fetched to return to Step S1304. If the pixel data is the last pixel data, the flow advances to Step S1308 whereat the value of i is reserved as the result of the whole gamut check, and thereafter the flow is terminated.

With the above process, the gamut check for the image data is executed, and the output ability degree (the number of pixels capable of being output) of the image data by each printer is obtained by using the gamut tag data and the like of the printer profile.

Figure 30:
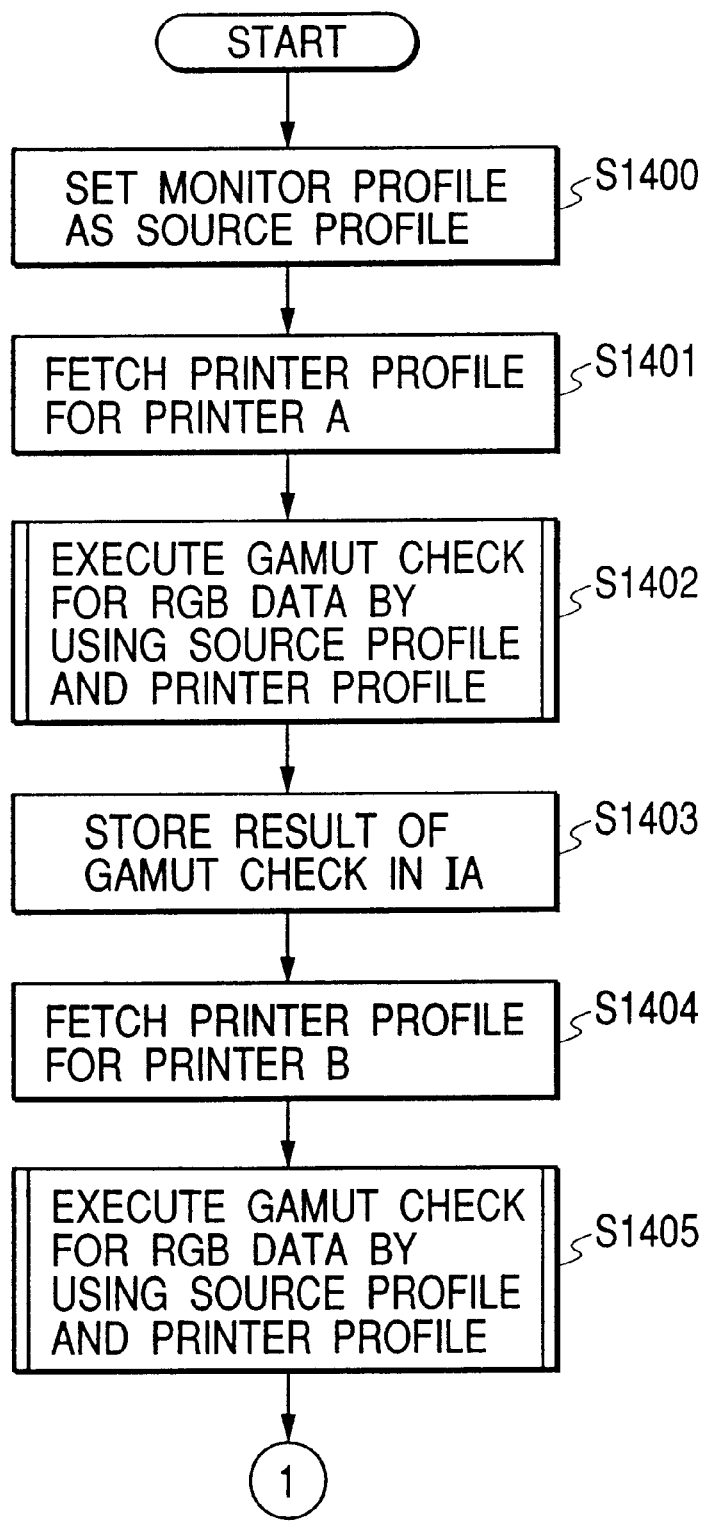
FIG. 30 is a flow chart illustrating the details of Step 1105 shown in FIG. 25.
Figure 31:
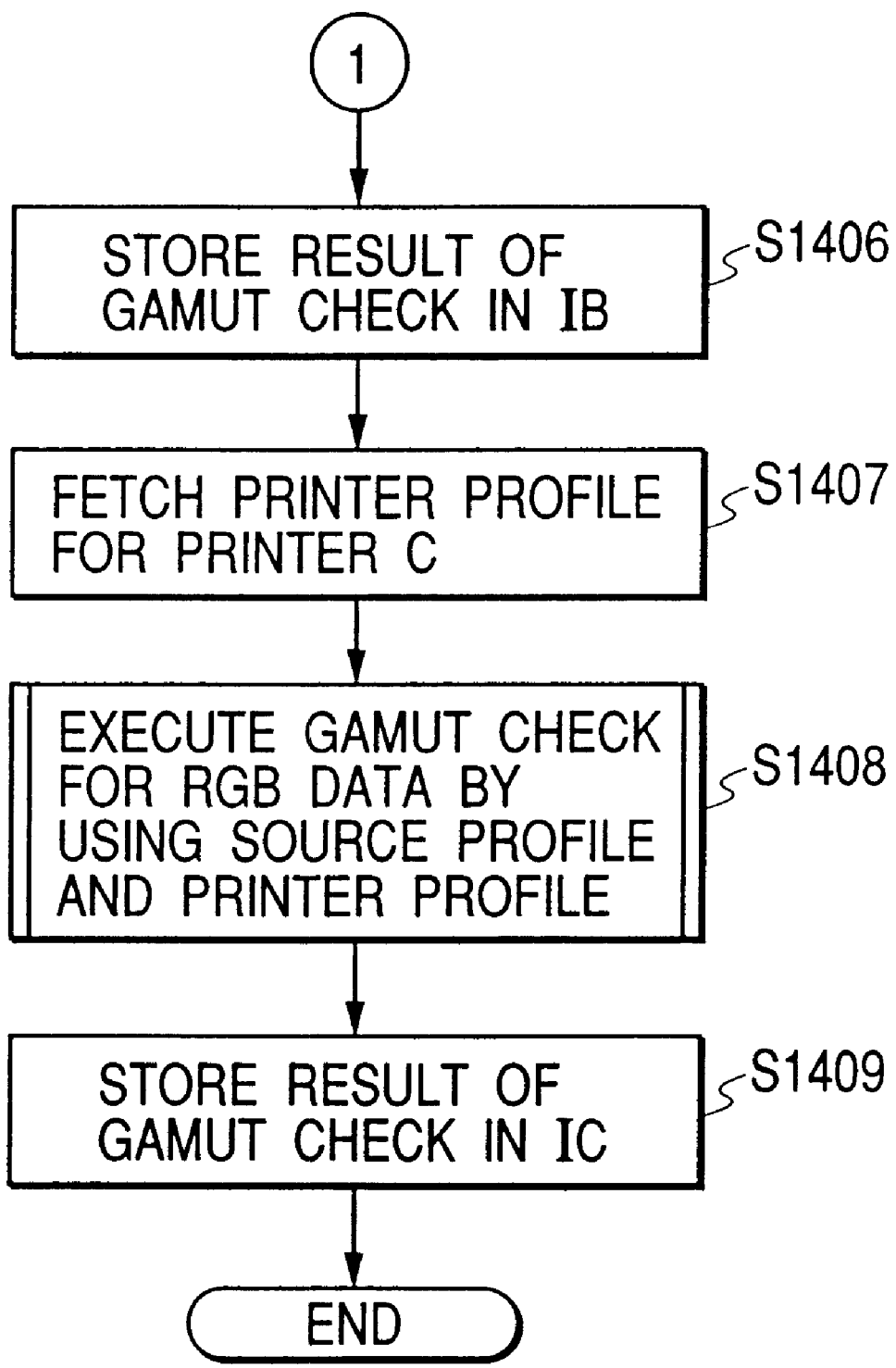
FIG. 31 is a flow chart illustrating the details of Step 1105 shown in FIG. 25.

FIGS. 30 and 31 are flow charts illustrating the details of Step S1105 shown in FIG. 25.

At Step S1400, the monitor profile of the monitor 111 is set as the source profile to follow Step S1401.

At Step S1401, the printer profile of the printer A is fetched from the profile storage unit 118 to follow step S1402.

At Step S1402, a gamut check for RGB data (each having eight bits and being variable in the range from 0 to 255) described with FIG. 19 is executed by using the source profile set at Step S1400 and the printer profile fetched at Step S1401, to thereby check the output ability degree (the number of pixels capable of being output) of the RGB data by the printer A and follow Step S1403.

At Step S1403, the result of the gamut check at Step S1402 is stored in IA (constant) to follow Step S1404.

At Step S1404, the printer profile of the printer B is fetched from the profile storage unit 118 to follow step S1405.

At Step S1405, a gamut check for RGB data described with FIG. 19 is executed by using the source profile set at Step S1400 and the printer profile fetched at Step S1404, to thereby check the output ability degree (the number of pixels capable of being output) of the RGB data by the printer B and follow Step S1406.

At Step S1406, the result of the gamut check at Step S1405 is stored in IB (constant) to follow Step S1407.

At Step S1407, the printer profile of the printer C is fetched from the profile storage unit 118 to follow step S1408.

At Step S1408, a gamut check for RGB data described with FIG. 19 is executed by using the source profile set at Step S1400 and the printer profile fetched at Step S1407, to thereby check the output ability degree (the number of pixels capable of being output) of the RGB data by the printer C and follow Step S1409.

At Step S1409, the result of the gamut check at Step S1408 is stored in IC (constant) to terminate the process.

With the above process, the gamut check for the RGB data is executed and the output ability degree (the number of pixels capable of being output) of the RGB data by each printer A, B, C can be stored in IA, IB, IC.

Figure 32:
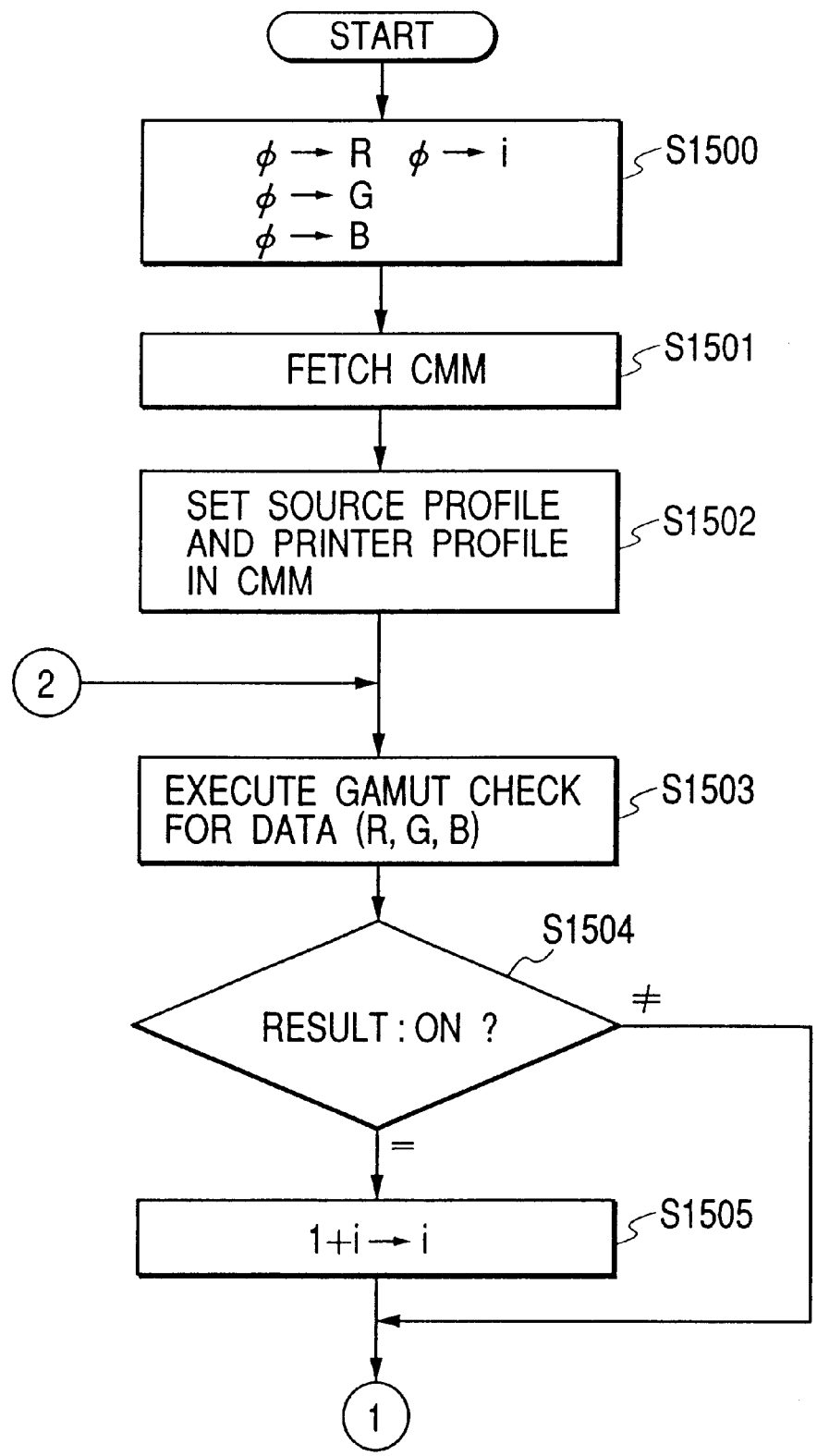
FIG. 32 is a flow chart illustrating the details of Step S1106 shown in FIG. 25.
Figure 33:
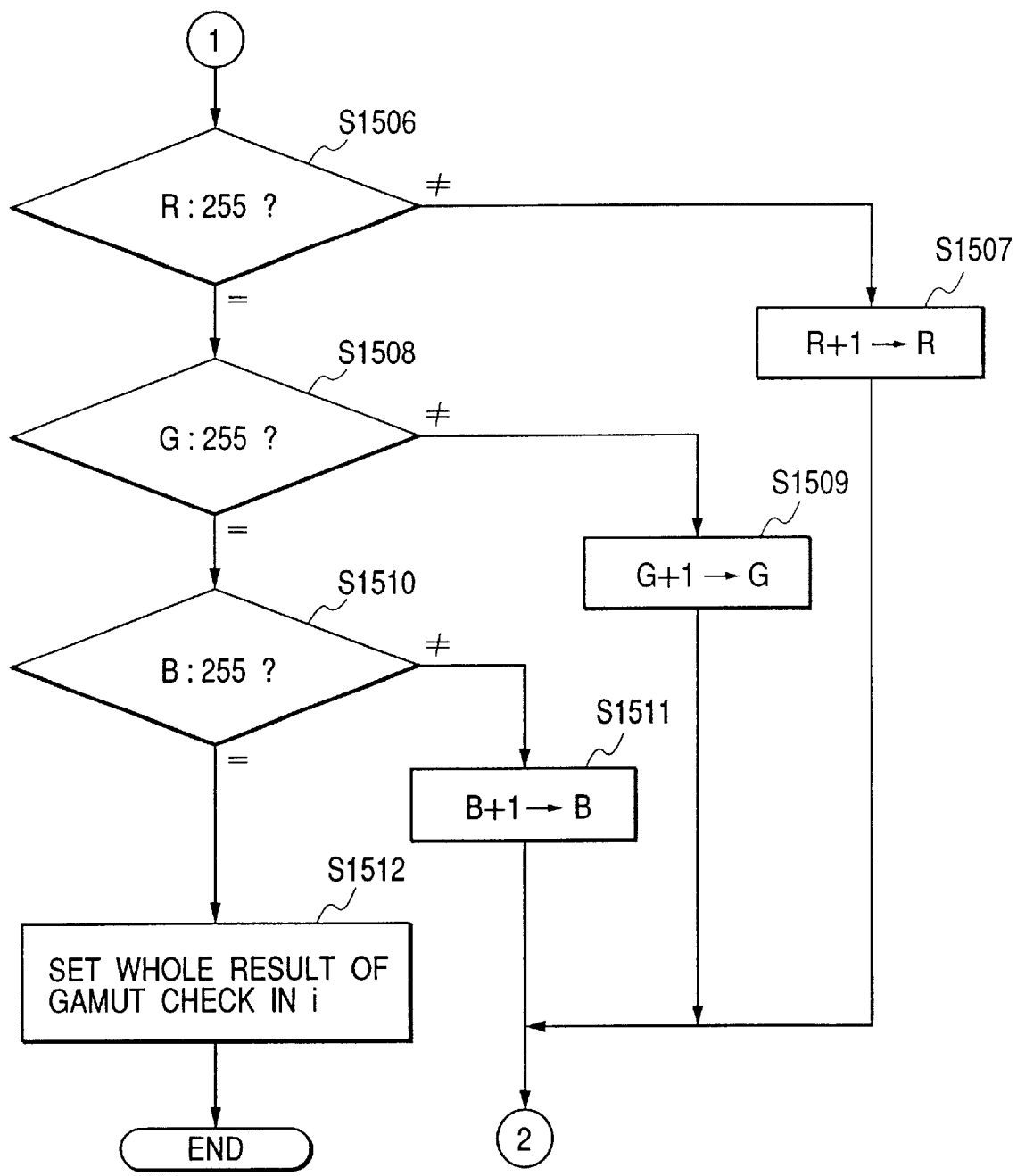
FIG. 33 is a flow chart illustrating the details of Step S1106 shown in FIG. 25.

FIGS. 32 and 33 are flow charts illustrating the details of Steps S1402, S1405 and S1408 shown in FIGS. 30 and 31.

At Step S1500, R, G and B are set with "0" and a variable i is set with "0" to follow Step S1501.

At Step S1501, CMM 114 is fetched to follow Step S1502.

At Step S1502, the source profile and printer profile are set to CMM 114 to follow Step S1503.

At Step S1503, a gamut check for RGB data is executed by using the profiles set to CMM 114 to thereafter follow Step S1504.

At Step S1504, the result of the gamut check is checked. If the result is not ON, the flow advances to Step S1506, whereas if ON, the flow advances to Step S1505 whereat i is incremented by "1" to follow Step S1506.

At Step S1506, the value of R is checked. If the value of R is not 255, the flow advances to Step S1507 whereat the value of R is incremented by "1" to return to Step S1503. If the value of R is 255, the flow advances to Step S1509 whereat the value of G is checked. If the value of G is not 255, the flow advances to Step S1509 whereat the value of G is incremented by "1" to return to Step S1503. If the value of G is 255, the flow advances to Step S1510 whereat the value of B is checked. If the value of B is not 255, the flow advances to Step S1511 whereat the value of B is incremented by "1" to return to Step S1503. If the value of B is 255, the flow advances to Step S1512 whereat the value of i is reserved as the result of the whole gamut check of the RGB data, and thereafter the flow is terminated.

With the above process, the gamut check for the RGB data (each having eight bits and being variable in the range from 0 to 255) of the monitor 111 characteristics, and the output ability degree (the number of pixels capable of being output) of the RGB data by each printer is obtained by using the gamut tag data of the printer profile.

Figure 34:
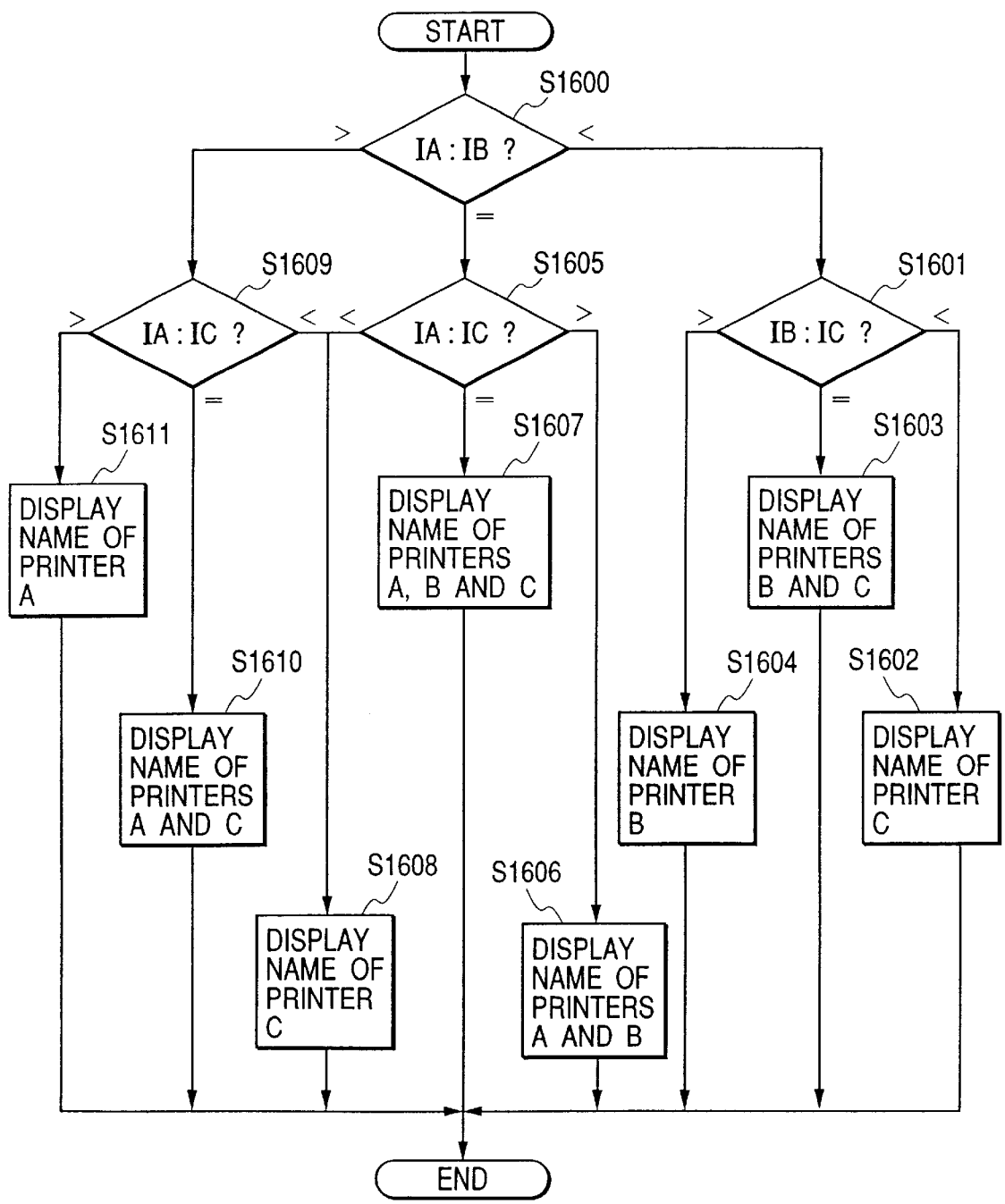
FIG. 34 is a flow chart illustrating the details of Steps S1102, S1106 and S1108 shown in FIG. 25.

FIG. 34 is a flow chart illustrating the details of Steps S1102, S1106 and S1108 shown in FIG. 25.

At Step S1600, the value of IA is compared with the value of IB.

If the value of IB is larger than the value of IA, the flow advances to Step S1601 whereat the value of IB is compared with the value of IC.

If it is judged at Step S1601 that the value of IC is larger than the value of IB, the flow advances to Step S1602 whereat the name of the printer C is displayed on a dialog to thereafter terminate the process.

If it is judged at Step S1601 that the values of IC and IB are equal, the flow advances to Step S1603 whereat the names of the printers B and C are displayed on the dialog to terminate the process.

If it is judged at Step S1601 that the value of IB is larger than the value of IC, the flow advances to Step S1604 whereat the name of the printer B is displayed on the dialog to terminate the process.

If it is judged at Step S1600 that the values of IB and IA are equal, the flow advances to Step S1605 whereat the value of IA is compared with the value of IC.

If it is judged at Step S1605 that the value of IA is larger than the value of IC, the flow advances to Step S1606 whereat the names of the printers A and B are displayed on the dialog to terminate the process.

If it is judged at Step S1605 that the values of IA and IC are equal, the flow advances to Step S1607 whereat the names of the printers A, B and C are displayed on the dialog to terminate the process.

If it is judged at Step S1605 that the value of IC is larger than the value of IA, the flow advances to Step S1608 whereat the name of the printer C is displayed on the dialog to terminate the process.

If it is judged at Step S1600 that the value of IA is larger than the value of IB, the flow advances to Step S1609 whereat the value of IA is compared with the value of IC.

If it is judged at Step S1609 that the value of IC is larger than the value of IA, the flow advances to Step S1608 whereat the name of the printer C is displayed on the dialog to terminate the process.

If it is judged at Step S1609 that the values of IA and IC are equal, the flow advances to Step S1610 whereat the names of the printers A and C are displayed on the dialog to terminate the process.

If it is judged at Step S1609 that the value of IA is larger than the value of IC, the flow advances to Step S1611 whereat the name of the printer A is displayed on the dialog to terminate the process.

As above mentioned, it is possible to display the name on the dialog by selecting a most proper network printer on the basis of the gamut check result.

According to the second embodiment, an optimum printer and corresponding printer driver can be selected from a plurality of network printers of a network system to print the color document while considering the type of color document data and the color reproduction ability of each color printer.

Third Embodiment

In the third embodiment, a modification of the second embodiment will be described. Instead of the process of the second embodiment, the following process is executed in the third embodiment.

In the second embodiment, the gamut check for RGB data is executed at Step S1105. With this process, however, although a printer can be selected with high precision, the number of gamut checks becomes very larger so that the process takes a long time.

If a color document is formed by application software such as DTP software of a client PC by using a pallet constituted of a predetermined number of colors, the gamut check at Step S1105 is executed only for the predetermined number of colors constituting the pallet.

Most of such software applications use a pallet of about 256 colors.

Since the number of gamut checks is limited to the number of colors constituting the pallet, the process can be executed at high speed.

For such a process, a document forming application is required to add the pallet to the document data. Step S1105 checks whether the document data is added with the pallet and selects the gamut check of either the second embodiment or the third embodiment.

At Step S1101 or S1107, at what degree each printer can reproduce an input document may be notified to a user. In this case, the user manually selects the printer.

In the flow charts of FIGS. 28 and 29 which illustrate the details of the gamut check at Steps S1101 and S1107, the following process may be executed in accordance with the result at Step S1305.

If it is judged at Step S1305 that the result is ON, the pixel is displayed by normal image processing, whereas if the result is OFF, the pixel is displayed in white.

With such a process, an area of the input document which a printer cannot reproduce with high fidelity can be visually confirmed.

Figure 35:
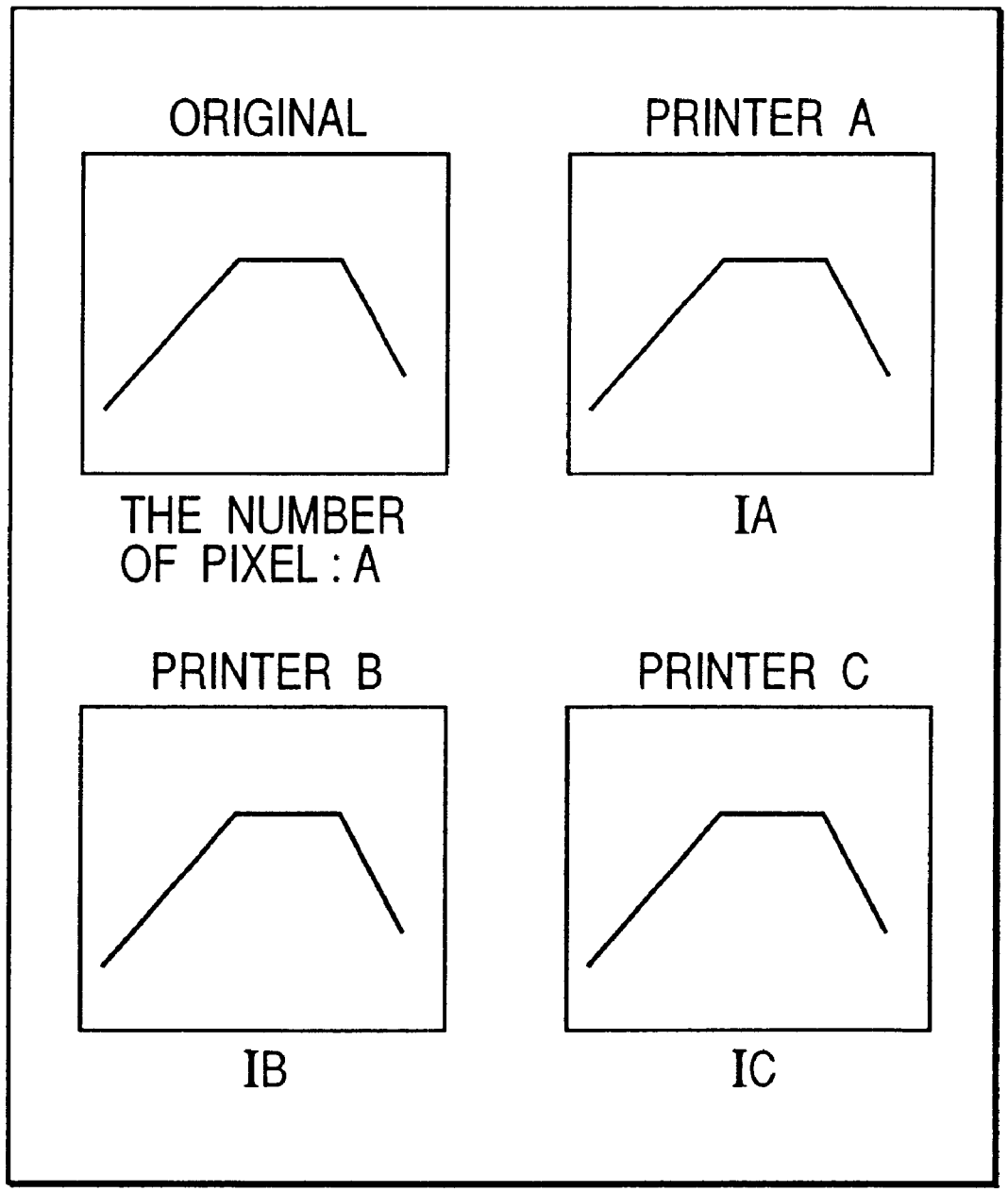
FIG. 35 shows an example of the display screen of the gamut check results.

Examples of display images are shown in FIG. 35. In FIG. 35, an original input image and the gamut check result of each printer are displayed in a juxtaposed style in order to allow a user to visually confirm the gamut check result of each printer. For the original input image, the total number of pixels in the original image is also displayed. For the printers, the output ability degrees represented by the values of IA, IB and IC are displayed.

A user manually selects the printer by referring to the display images. This manual selection may be performed, for example, by designating a desired image shown in FIG. 35 with a mouse.

With such display images, the user can recognize the reproduction state of each printer visually from the display images and physically from the IA, IB and IC values. It is therefore possible for a user to select an optimum printer from a plurality of network printers.

Fourth Embodiment

A number of printers are possibly connected to a large scale network system, or some printers are installed at remoter locations.

In such a case, a user may limit the number of network printers relative to which the process of each of the embodiments is executed to select an optimum printer from the limited number of network printers.

Other Embodiments

The scope of the invention includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disc, a hard disc, an optical disc, a magneto-optical disc, a CD-ROM, a magnetic tape, a non-volatile memory card, a ROM, and the like.

The invention has been described in connection with the above preferred embodiments. The invention is not limited only to the above embodiments, but various modification are possible without departing from the scope of the appended claims.

What is claimed is:

1. An image processing apparatus comprising:

discriminating means for discriminating an image type of a color document; and selecting means for automatically selecting an output device for outputting the color image from among a plurality of output devices on the basis of a discrimination result obtained by said discriminating means and color gamut information of the plurality of output devices.

2. An image processing apparatus according to claim 1, wherein said discriminating means discriminates whether or not the color document contains only an image.

3. An image processing apparatus according to claim 1, further comprising:

setting means for setting whether or not importance is attached to an image, in accordance with a user's manual instruction; and extracting means for extracting an image included in the color document if said setting means attaches importance to an image, wherein said selecting means selects an output device for outputting a color image, in accordance with the extracted image and the color gamut information of the plurality of output devices.

4. An image processing apparatus according to claim 1, wherein the color gamut information is written in profiles of the output devices.

5. An image processing apparatus according to claim 1, wherein said selecting means has a gamut check function of discriminating whether a subject color is in the color gamut, and wherein the gamut check function executing a gamut check process by using a gamut checking method corresponding to the discriminated image type.

6. An image processing apparatus according to claim 1, further comprising setting means for setting the plurality of output devices in accordance with a user instruction.

7. An image processing apparatus according to claim 1, wherein driver software corresponding to the output device selected by said selecting means is activated to perform an image forming process.

8. An image processing method comprising:

a discriminating step, of discriminating an image type of a color document; and a selecting step, of automatically selecting an output device for outputting the color document from among a plurality of output devices on the basis of a discrimination result obtained in said discriminating step and color gamut information of the plurality of output devices.

9. A storage medium for storing an image processing program, the image processing program comprising:

a discriminating function of automatically discriminating an image type of a color document; and a selecting function of selecting an output device for outputting the color document from among a plurality of output devices on the basis of a discrimination result obtained with said discriminating function and color gamut information of the plurality of output devices.

10. An image processing method comprising the steps of:

inputting color gamut information of a subject output device;

inputting color gamut information of a plurality of output devices different from the subject output device; and automatically selecting an output device for performing a proof for the subject output device from the plurality of output devices, on the basis of the color gamut information of the subject output device and the color gamut information of the plurality of output devices.

11. An image processing method according to claim 10, wherein the color reproduction range information is stored in a multi-dimensional table, and wherein the number of grids of a multi-dimensional table representing the color gamut information of the plurality of output devices is converted according to the number of grids of a multi-dimensional table indicating the color gamut information of the subject output device.

12. An image processing method according to claim 11, wherein an output device for performing a proof for the subject output device is automatically selected by comparing the number of grids indicating an inside of a color gamut of the multi-dimensional table representing the color gamut information of the subject output device with the number of grids indicating an inside of a color gamut included in the multi-dimensional table representing the color gamut information of each of the plurality of output devices.

13. An image processing method according to claim 10, wherein the color gamut information is stored in a profile to be used by a color matching process.

14. An image processing method according to claim 10, wherein the subject output device and the plurality of output devices are network printers.

15. An image processing method according to claim 10, wherein a user is notified if a high precision proof is not possible.

16. An image processing method comprising the steps of:

inputting a multi-dimensional table representing color gamut information of a first device and a multi-dimensional table representing color gamut information of a second device; and comparing a color gamut of the first device with a color gamut of the second device by matching the number of grids of the multi-dimensional table representing the color gamut information of the first device and the number of grids of the multi-dimensional table representing the color gamut information of the second device.

17. An image processing apparatus comprising:

inputting means for inputting color gamut information of a subject output device and color gamut information of a plurality of output devices different from the subject output device; and selecting means for automatically selecting an output device for performing a proof for the subject output device from among the plurality of output devices, on the basis of the color gamut information of the subject output device and the color gamut information of each of the plurality of color output devices.

18. A computer readable storage medium storing a program, the program comprising the steps of:

inputting color gamut information of a subject output device and color gamut information of a plurality of output devices different from the subject output device; and selecting automatically an output device for performing a proof for the subject output device from among the plurality of output devices, on the basis of the color gamut information of the subject output device and the color gamut information of each of the plurality of color output devices.

19. A memory medium storing computer-executable code for effecting performance of an image processing method that comprises the steps of:

inputting a multi-dimensional table representing color gamut information of a first device and a multi-dimensional table representing color gamut information of a second device; and comparing a color reproduction range of the first device with a color gamut of the second device by matching the number of grids of the multi-dimensional table representing the color gamut information of the first device and the number of grids of the multi-dimensional table representing the color gamut information of the second device.

* * * * *